(12) United States Patent
Borras et al.

(10) Patent No.: US 11,403,886 B2
(45) Date of Patent: Aug. 2, 2022

(54) HIGH ACCURACY GEO-LOCATION SYSTEM AND METHOD FOR MOBILE PAYMENT

(71) Applicant: GEOTOLL, INC., Cooper City, FL (US)

(72) Inventors: Jaime Andres Borras, Miramar, FL (US); Wyatt Drake Geist, Davie, FL (US)

(73) Assignee: Geotoll, Inc., Cooper City, FL (US)

( * ) Notice: Subject to any disclaimer, the term of this patent is extended or adjusted under 35 U.S.C. 154(b) by 0 days.

(21) Appl. No.: 17/113,724

(22) Filed: Dec. 7, 2020

(65) Prior Publication Data

US 2021/0183169 A1 Jun. 17, 2021

Related U.S. Application Data

(63) Continuation-in-part of application No. 16/237,070, filed on Dec. 31, 2018.

(60) Provisional application No. 62/611,973, filed on Dec. 29, 2017.

(51) Int. Cl.
*G06Q 40/00* (2012.01)
*G07B 15/06* (2011.01)
*G06Q 20/32* (2012.01)
*H04W 4/029* (2018.01)

(52) U.S. Cl.
CPC ....... *G07B 15/063* (2013.01); *G06Q 20/3224* (2013.01); *H04W 4/029* (2018.02)

(58) Field of Classification Search
USPC ...... 705/26, 28, 39, 37, 40, 41, 45; 235/379, 235/380
See application file for complete search history.

(56) References Cited

U.S. PATENT DOCUMENTS

| 7,053,793 | B2 * | 5/2006 | Tajima | G07B 15/02 455/406 |
| 8,587,454 | B1 * | 11/2013 | Dearworth | G07B 15/063 340/5.1 |
| 9,691,188 | B2 * | 6/2017 | Breed | G07B 15/063 |

(Continued)

OTHER PUBLICATIONS

Electronic Toll Collection System Based on Global Positioning System Technology; 2010 International Conference on Challenges in Environmental Science and Computer Engineering (vol. 2, pp. 11-14); Saijie Lu, Tiejun He, Zhaohui Gao; Mar. 6, 2010. (Year: 2010).*

*Primary Examiner* — Tien C Nguyen
(74) *Attorney, Agent, or Firm* — The Concept Law Group, PA; Scott M. Garrett; Scott D. Smiley

(57) ABSTRACT

Location polygons are defined along traffic lanes and parking spaces to facilitate determination of the location of a vehicle relative to features associated with the location polygons. The location polygons are used, in one application, to identity entrance and exit of a special toll lane along a roadway, and to ensure that the vehicle properly enters and exits the tolling lane. The location polygons define geofenced regions, and each definition for a geofenced region can include one or more rules that are used to evaluate location information reported by a user's equipment. The rules dictate whether an action it taken or inhibited, such as charging a toll or not charging a toll, based on other location information reported by the user's equipment.

5 Claims, 30 Drawing Sheets

(56) References Cited

U.S. PATENT DOCUMENTS

| | | | |
|---|---|---|---|
| 2007/0278300 A1* | 12/2007 | Dawson | G07B 15/06 705/13 |
| 2008/0161987 A1* | 7/2008 | Breed | G08G 1/161 701/27 |
| 2012/0215594 A1* | 8/2012 | Gravelle | G07B 15/063 705/13 |
| 2014/0278838 A1* | 9/2014 | Novak | G07B 15/02 705/13 |

* cited by examiner

HIGH ACCURACY GEO-LOCATION SYSTEM AND METHOD FOR MOBILE PAYMENT

CROSS REFERENCE

This application is a continuation in part of U.S. patent application Ser. No. 16/237,070, titled "High Accuracy Geo-Location System and Method for Mobile Payment," filed Dec. 31, 2018, and further claims the benefit of provisional application No. 62/611,973, "High Accuracy Geo-Location System and Method for Mobile Payment," filed Dec. 29, 2017. This application further claims the benefit of U.S. provisional application No. 62/943,938, titled "High Accuracy Geo-Location System and Method for Mobile Payment," filed Dec. 5, 2019. The disclosures of each of these applications are hereby incorporated by reference.

FIELD OF THE DISCLOSURE

The present disclosure relates generally to tolling and parking payment systems, and more particularly to the use of novel techniques to derive high geo-location accuracy determination for dynamically defined tolling lanes and parking spaces for mobile payments.

BACKGROUND

The use of Global Positioning System (GPS) receivers in smartphones has revolutionized location based services since its inception. However, there have been incidents where the relatively low location accuracy (or lack thereof) of GPS has caused loss of lives. The relatively low accuracy has also meant that GPS, in the past, has limited the range of location-based applications. One such application navigation tracking, and determining which lane of a multi-lane roadway a vehicle is traveling in. Have the location accuracy to determine which lane a vehicle is in would enable determining when a vehicle is in a High Occupancy Vehicle (HOV) lane. The best theoretical accuracy for existing GPS is on the average of 5 to 15 meters, and it can vary depending on the surroundings (obstacles to line-of-sight from the satellites), the devices (type) used; the weather and many other factors, with an average worst case of 30 to 40 meters. HOV lane use and verification, and many other applications, need much better accuracy performance to ensure a vehicle is actually in an HOV lane, as well as to determine when a vehicle is not in an HOV lane. As used herein, and HOV lane a lane of a multi-lane roadway, typically on a highway or freeway, that normally requires payment of a toll or fee to use. However, if a vehicle has multiple people in it, a discount on that toll/fee may be applied to reduce the toll/fee.

One reason the existing location accuracy varies so much is because commercial GPS has been derived from the classic L1 signal transmitted from existing satellites. This signal is influenced easily by multipath reflections and interference in unfavorable and obstructive conditions, hence not providing the shortest signal path to the GPS receiver, instead a glob of multipath signals (e.g. signal echoes produced by the signal being reflected by large structure, both natural and man-made) create the highly varying average accuracy. However, there is a recently new mass-market GPS chip that became available to smartphones in 2018 which increased accuracy to ~30 centimeters. This new chip takes advantage of another signal now available in the new generation of satellites called L5. This signal also provides satellite location and timing synchronization information, but the new signal has almost twice the power of the L1 signal, and it uses a more robust modulation at a different frequency which decreases interference and improves multipath rejection making it easier for the GPS receiver to acquire the L5 signal. This, in combination with the more power and efficient chip manufacturing process, the improved smartphone power saving architectures, and the availability of more new satellites with the L5 signal, allows for a new tier of location-based applications and services.

HOV toll lanes or express toll lanes for multi-occupancy vehicles can provide an effective way to bypass traffic for the user; and for the agency, a way to generate additional funding for the construction of new roads. HOV lanes may charge full price for single occupancy vehicles, half price for high occupancy vehicles with two or more occupants and nothing for high occupancy vehicles with three or more occupants. However, HOV lanes take a long time to be constructed and they do not resolve the traffic congestion problem if there is an accident or construction in the lane because there is no way to dynamically redefine an HOV lane.

Similarly, a problem exists with parking spaces. Parking lots and spaces conventionally require some infrastructure, such as lot attendants, meters, or centralized payment kiosks. In some places drivers can pay by phone for a specific parking spot, but these all still require the physical delineation of parking spaces. Present GPS accuracy is not good enough to identify a given parking spot when a vehicle pulls into a specific space without a considerable settling time to average location determinations, which is typically longer than a person is willing to wait before exiting and leaving the vehicle.

Other vehicle-related services will greatly benefit from higher accuracy GPS, such as, for example, the ability to distinguish between private and public roadways in order to determine a road usage tax, which is being given increasing consideration as the number of electric vehicles, which do not pay taxes through the purchase of gasoline, increase. Furthermore, services such as "curbside" delivery can be enabled by higher accuracy GPS, allowing a driver to drive into a specific parking/waiting space on a merchant's grounds, indicate their space to a merchant, and have goods brought out to their specific parking space.

Since it will take some time for all of the models to adapt the new chip technology, there is a need for solutions that improve GPS accuracy in tolling with the L1 signal alone. Accordingly, there is a need for a method and apparatus to improve location accuracy for a variety of vehicular-related applications.

BRIEF DESCRIPTION OF THE FIGURES

The accompanying figures throughout the separate views, together with the description below, and are incorporated in and form part of the specification to further illustrate embodiments of concepts that include the claimed invention and explain various principles and advantages of those embodiments.

DETAILED DESCRIPTION

A system for identifying the location of a vehicle is disclosed in which a mapping of physical spaces in which vehicles can travel and/or park is defined by location polygons that describe the geo-location coordinates of their corresponding physical spaces. Rather than relying on the exact location determined by a satellite location system, the location is mapped to a location polygon to account for errors in the location determinations. Any location mapped to a given location polygon implies the vehicle (as inferred by the location of the device used to determine location) is in the location corresponding to the location polygon. Thus, travel along specific lanes of multi-lane roadways can be determined and tracked. This allows, for example, toll charges for using high occupancy vehicle lanes, as well as assessing whether the vehicle has violated the HOV lane boundaries by improperly entering or exiting the HOV lane. In other applications location polygons can be used for parking applications where they identify specific parking spaces for regular parking, or for drive-up delivery parking at retail locations. Location polygons can be used to distinguish private from public roadways for determining road use charges.

Furthermore, the use of location polygons to define roadway features such as tolling lanes, HOV lanes, and parking spaces allows the dynamic definition of the these features over existing physical roadways. That allows, for example, the instant creation of an additional HOV or tolling lane, the designation of one or more lanes as non-toll lanes (e.g. in the event of an emergency evacuation), re-routing of lanes due to temporary conditions such as construction, accidents, the dynamic creation and designation of parking spaces, and so on. This is especially useful when used in conjunction with high precision satellite location systems such as the GPS L5 signal. Furthermore, it is useful in conjunction with connected autonomous vehicles that can be designed to follow and utilize such dynamically defined roadway features.

Figure 1:
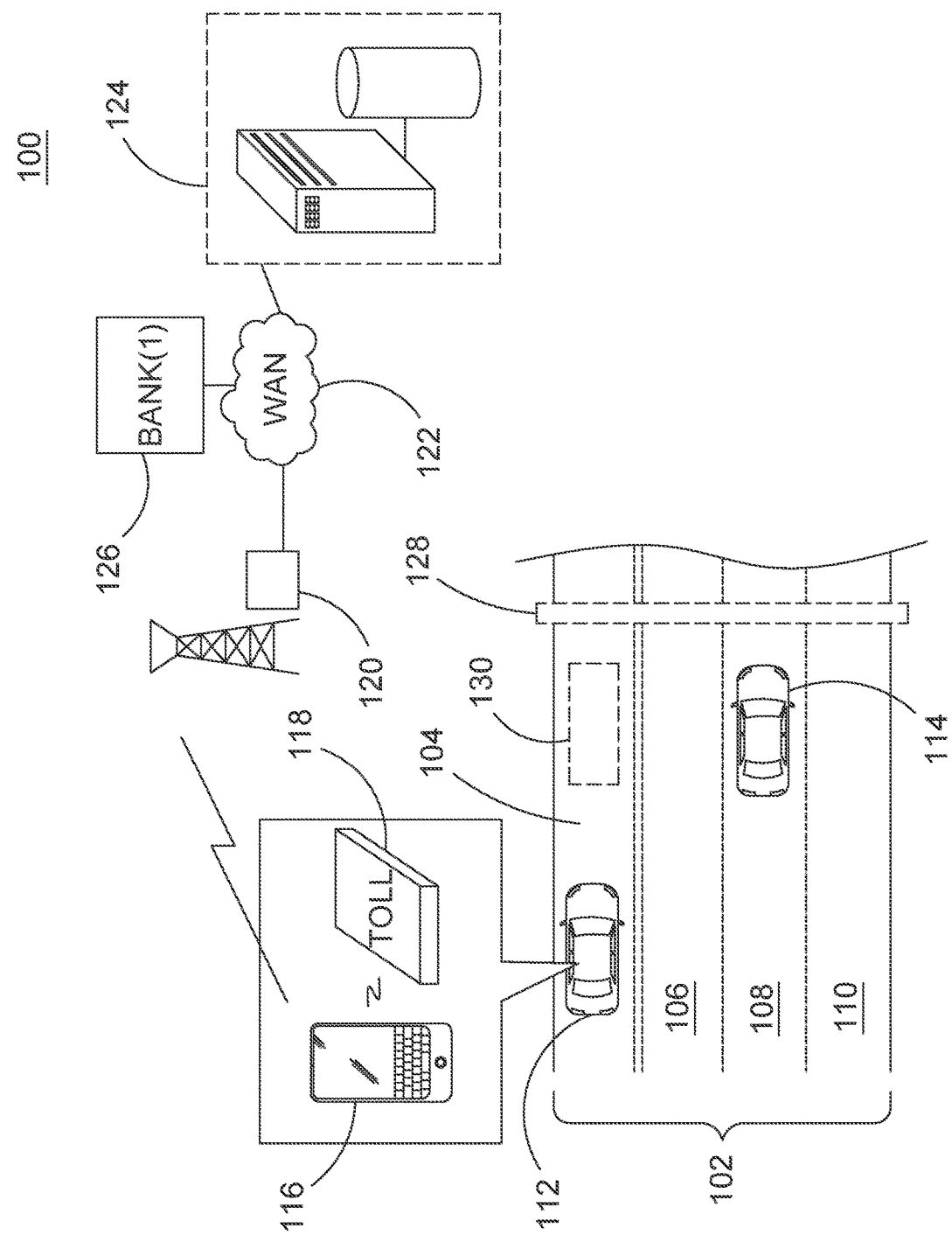
FIG. 1 is a system diagram for a geo-location payment system for vehicular applications, in accordance with some embodiments.

FIG. 1 is a system diagram for a geo-location payment system 100 for vehicular applications, in accordance with some embodiments. The system 100 represents an overview of system that can dynamically define virtual regions that correspond to physical locations on which vehicles can travel for which the operator of the vehicle is charged a toll or other monetary charge for travelling in those defined regions. There are numerous applications of mobile charging for vehicular usage and the present disclosure focuses on both travelling applications and parking applications. The system 100 illustrates a travelling application (as opposed to a parking application) in which a roadway 102, comprised of several lanes 104, 106, 108, 110 for travel in the same direction, passes through a tolling point 128 (e.g. a gantry—real or virtual), and can include a high occupancy vehicle (HOV) lane which offers a toll discount in order to encourage ride sharing. One or more of the lanes 104, 106, 108, 110 can be non-toll lanes in some embodiments. A HOV lane is generally reserved for vehicles which have two or more occupants (including the driver), and in some applications a discount can correspond to the number of occupants. For example, in some locales, if there are four or more occupants then the toll is discounted 100%. Vehicle 112 is shown travelling in the HOV lane 104 while vehicle 114 is shown in a non-HOV lane 108, where both vehicles 112, 114 are approaching the tolling point 128.

Toll is paid electronically in response to a vehicle passing a tolling point such as tolling point 128. In some embodiments, tolling can be done via an application on a mobile device such as a cellular phone device 116 that can be present in vehicle 112. The cellular phone device 116 can be communicatively linked to a toll transponder 118 that interacts with a gantry or similar toll reader. In some embodiments tolling point 128 can be a toll gantry that includes toll readers over each lane or just the HOV Express Lane. Toll readers transmit a radio signal in a narrow pattern over their respective lane that, upon being received by a toll transponder 118, causes the toll transponder 118 to respond by transmitting its unique identifier back to the reader. The tolling agency operating the tolling point 128 then bills the toll to an account associated with the identifier of the toll transponder 118. In some embodiments the toll transponder 118 can be normally asleep until the communicatively linked cellular phone device 116 (or similar mobile device) detects approach of the tolling point 128 and wakes up or otherwise activates the toll transponder 118. The unique identifier provided by the toll transponder 118 can be given to the toll transponder 118 by the cellular phone device 116. Thus, if the toll transponder 118 is stolen it can't be used to make charges against the owner's toll account.

To administer a toll account the user of the cellular phone device 116 can use the cellular phone device to run a tolling application program to connect to a toll service server or web service 124 by communicating through a cellular infrastructure 120 that is connected to a wide area network 122 (WAN) such as the Internet. The toll service server 124 can maintain account information, including records of transactions and a balance of the user's account. The user can access the user's bank 126 to periodically or occasionally as needed transfer funds to the tolling service server 124. As the user's vehicle (e.g. vehicle 112) passes a tolling point, such as tolling point 128, the user's account will be debited by the toll amount and a transaction record created to reflect the toll charge and balance adjustment. It will be appreciated by those skilled in the art that other access modalities can be used to administer a toll account at the toll service server 124, including using a personal computer that is connected to a data network or equivalent that is further connected to the WAN 122. Further, the cellular phone device 116 can include other communication modalities, including wireless local area networking, also known as "Wi-Fi." and Bluetooth.

The cellular phone device 116 can further include a location system for determining its location, such as GPS. Use of GPS by mobile devices is widespread and common around the world, and is used for a variety of location-based applications, including navigation, trip routing, mapping, and numerous other applications. In order to verify that the vehicle 112 is within the HOV lane 104, the tolling system defines location polygons defined by location coordinates. The location polygons are virtual objects that correspond to real areas. For example, several rectangle, such as rectangle 130, can be defined over the HOV lane 104. When the cellular phone device determines its location, it can compare the location to known location polygons provided by a service such as the tolling service. If the determined location is within the boundary of the location polygon then it is reasonably sure that the cellular phone device is in the physical area corresponding to the location polygon. Furthermore, many cellular phone devices sold today also include inertial measurement systems comprising multi-dimensional accelerometer arrays, as well as electronic compasses, that can be used to determine movement and changes in movement and direction, and which can be used to augment location determination and to facilitate faster location determinations.

In the case of the present example, cellular phone device 116 can receive a collection of polygon definitions from the toll service server 124, and compare its determined location to the set of defined location polygons. Location polygon definitions can be used to define toll lane maps, parking space maps, public/private roadway maps, and so on, and these can be delivered to the cellular phone device 116 as a map file. Since the car 112 in which the cellular phone device 116 travelling is moving, the location determination can have some error. However, the error will be small enough that it will still fall within location polygon 130 as it is travelling in lane 104, indicating it is within lane 104 and as such, the toll charged upon passing tolling point 128 is subject to any applicable discount, based on the number of occupants of vehicle 112. If the vehicle 112 does not have a required number of occupants to qualify for the HOV lane, then a penalty can be assessed in the same way as a toll is charged.

Alternatively, lane 104 can be a toll lane, such as, for example, an express lane. By restricting use of lane 104 to toll paying users, while lanes 106, 108, 110 remain free, fewer people will use lane 104, allowing traffic to flow faster and/or with less interruption. A charge based on the distance driven while in the toll lane 104 can be assessed like a toll.

To enable the toll lane 104, a series of location polygons can be defined along the portion of toll lane 104 that is to be used as a toll lane. The cellular phone device 116, by use of a suitable tolling application program, can track the presence of the vehicle 112 in the toll lane 104 and a corresponding charge for the distance driven in the toll lane 104 can be determined. Likewise, just as the cellular phone device 116 can determine when its location is within the location polygons that define the toll lane 104, it can also determine when it has left the toll lane by no longer being present with the location polygons that define the toll lane 104. One of the advantages of defining an HOV lane or a toll lane by location polygons is the route of the lane can be dynamically changed by simply using location polygon corresponding to the active route of the HOV/toll lane.

Figure 2:
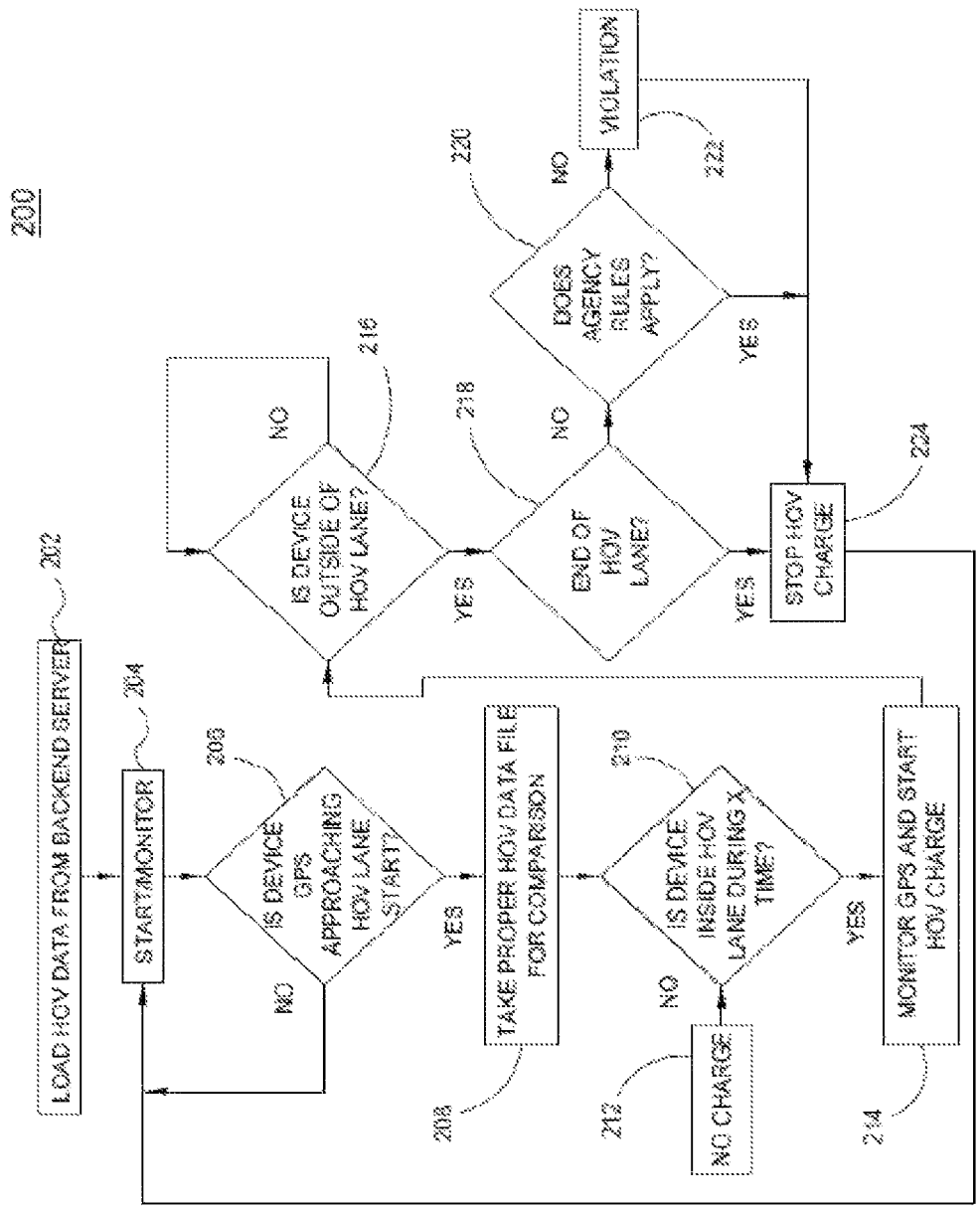
FIG. 2 is a flow chart diagram of a method for High accuracy GPS device algorithm for continuous enforcement HOV lane, in accordance with some embodiments.

FIG. 2 is a flow chart diagram of a method 200 for using a high accuracy GPS device algorithm for enforcement of HOV lane, in accordance with some embodiments. In particular, the method 200 is an overview of the general method for charging a HOV/tolling lane use toll, and determines when, and how much, to charge a user for travelling in an HOV or toll lane. As a preliminary matter, it is assumed that the vehicle includes a cellular phone device that has installed, and which is executing, a tolling application program consistent with the instant disclosure. Furthermore, the user of the cellular phone device has set up a tolling account with a toll service that operates a tolling service server, and the cellular phone device, as result of running the tolling application program, is able to communicate with the tolling service server through data networks. Additionally, the cellular phone device may be assumed to be using a high accuracy GPS signal for location determination (e.g. the L5 signal). As one of the tasks performed by the tolling application program, in step 202 the data including location polygons that define the location of areas such as HOV/tolling lanes is fetched and downloaded from a tolling service server or an equivalent. As mentioned in regard to FIG. 1, the location polygons are defined by location coordinates (e.g. at the vertices of the polygons) which allow the cellular phone device to determine, using its satellite positioning system, to determine whether it is inside a location polygon, meaning within a physical area corresponding to the area defined by the location polygon.

In step 204 the cellular phone device can commence determining its present location using its satellite positioning system. This action should be repeated at intervals sufficient to ensure that the cellular phone device can detect when it is within a defined location polygon. In some embodiments the monitoring can be continuous, or the monitoring rate can be increased as the cellular phone device's location indicates it is getting closer to one or more defined location polygons.

In step 206 the cellular phone device can determine, for example, if the direction of travel and the route it is travelling indicates that it is approaching a defined HOV or tolling lane. The tolling lane can be defined by location polygons corresponding to the boundary of actual physical traffic lane that is being defined as a tolling lane. In step 208 the cellular phone device can use the defined HOV/tolling lane data file, which includes one or more defined location polygons corresponding to the physical location of the traffic lane being designated a HOV/tolling lane, to compare with the present location of the cellular phone device. At this point in the process the cellular phone device should be conducting location determinations at its maximum rate in order to ensure that the time in the HOV/tolling lane is accurate.

In step 210, the cellular phone device can determine, based on the comparison of step 208, whether the cellular phone device, and by inference, the vehicle in which it is located, is inside the HOV/tolling lane. If the location coordinates determined in step 210 are outside of the defined location polygons for the HOV/tolling lane, then no toll is charged as indicated in step 212 (and the method can return to step 210).

While the location determination and comparison in step 210 indicates the location is within the defined tolling polygons that correspond to the HOV/tolling lane, then in step 214 the distance travelled can be monitored and recorded in order to determine the toll to be charged. Once it is determined that the vehicle is in the HOV/tolling lane, then the method can proceed to step 216 (which can be a duplicate of step 210) where the cellular phone device monitors the location to determine where the vehicle has left the defined HOV/tolling lane, based on a comparison of the location with the location polygons that define the HOV/tolling lane location. Step 216 can be repeated as long as the location determination continues to fall within the defined location polygons.

When the determined location indicates the vehicle has left the HOV/tolling lane in step 216, then in step 218 there can be a determination as to whether the HOV/tolling lane has ended, or whether the vehicle has left the HOV/tolling lane before the end of the HOV/tolling lane. If the HOV/tolling lane ended, meaning vehicle has remained in a traffic lane but the HOV/tolling charge no longer applies, then in step 224 the tolling charge is stopped and a final total toll can be calculated and applied to the user's account. Any discounts for high occupancy can be applied to the final toll charge.

If, in step 218, it is determined that the vehicle has left the HOV/tolling lane early, then in some cases there may be a fine assessed for leaving the HOV/tolling lane early. In step 220 the method 200 determines whether there is a violation of a HOV/tolling lane rule for leaving the HOV/tolling lane before the end of the HOV/tolling lane. If there is a rule against leaving the HOV/tolling lane early, then in step 222 a violation is assessed, which can include an additional charge. If no rule applies then the tolling can simply stop by proceeding to step 224.

Figure 3:
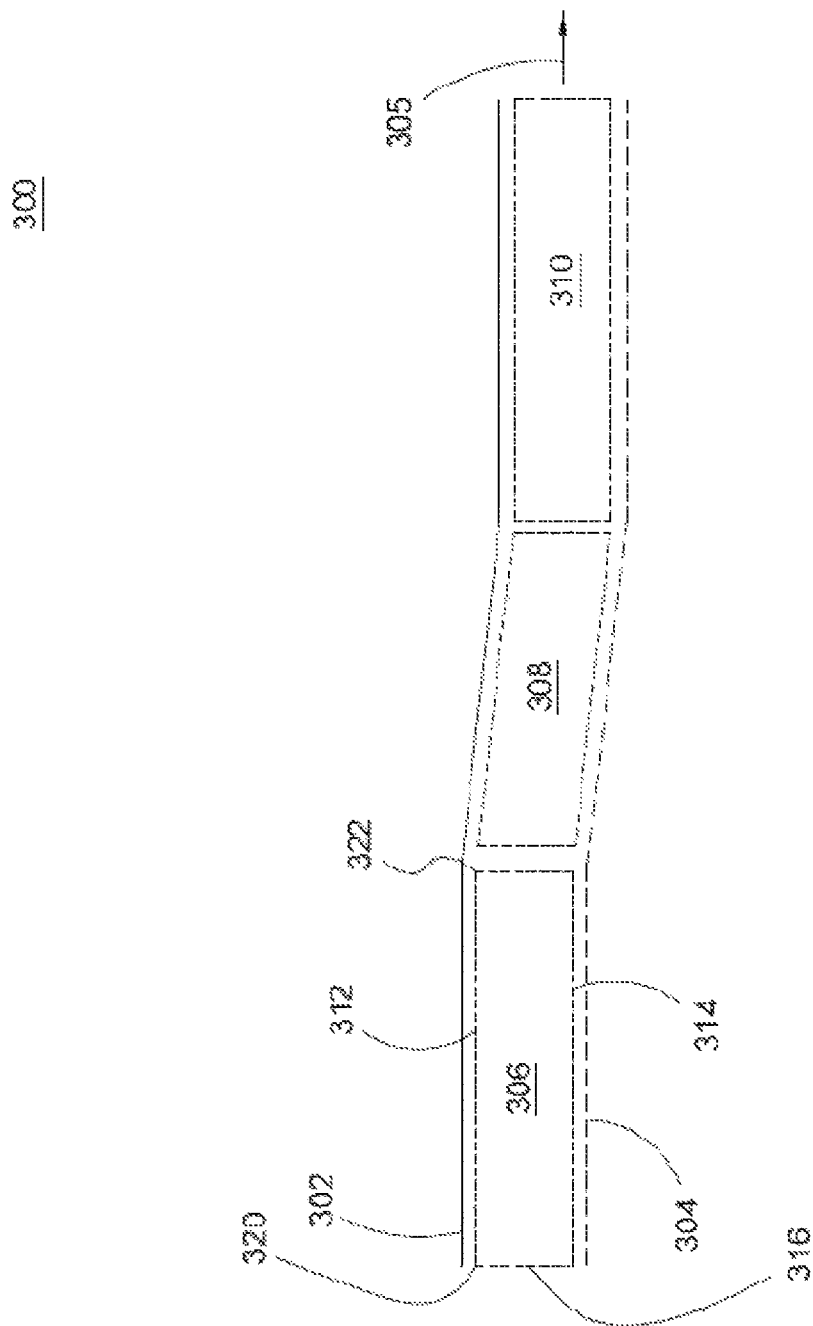
FIG. 3 is a location polygon mapping for defining location polygons corresponding to a physical traffic lane, in accordance with some embodiments.

FIG. 3 is a location polygon mapping 300 for defining location polygons corresponding to a physical traffic lane, in accordance with some embodiments. The traffic lane shown here is defined between a left lane boundary 302 and a right lane boundary 304 where traffic moves along the traffic lane in the direction of arrow 305. The left lane boundary is shown in a solid line indicating that the traffic lane can be the inner-most or left-most traffic lane of a multi-lane bidirectional roadway in North America. The adjacent lane that would be present to the right are not shown. Several location polygons 306, 308, 310 are defined along the traffic lane. Each location polygon is defined by three or more sides and three or more vertices. For example, location polygon 306 is defined as a rectangle having sides 312, 314, 316, and 318. Vertices are formed at the corners, such as corners 320, 322. The vertices can be defined by geo-location coordinates, and lines between the vertices can be assumed. Thus, any location that is bounded by lines between the vertices of the location polygon such as location polygon 306 is within the location polygon 306, and therefore assumed to be in the traffic lane.

As shown here, the location polygons 306, 308, 310 are shown with distinct separation between each other, and from the boundaries 302, 304 of the traffic lane solely to show the location polygons clearly. In practice, the location polygons will abut each other, if not overlap each other, and can extend to the edges 302, 304 of the traffic lane. The location polygons will extend as long as the traffic lane remains relatively straight. If the traffic lane deviates by more than a threshold distance, then a new location polygon can be defined. Thus, location polygon 308 is defined where the traffic lane slightly changes direction from the area corresponding to location polygon 306, and likewise location polygon 310 is defined where the traffic lane again shifts direction. The same type of criteria be used to map location polygons along curves, corners, bends, etc.

Figure 4:
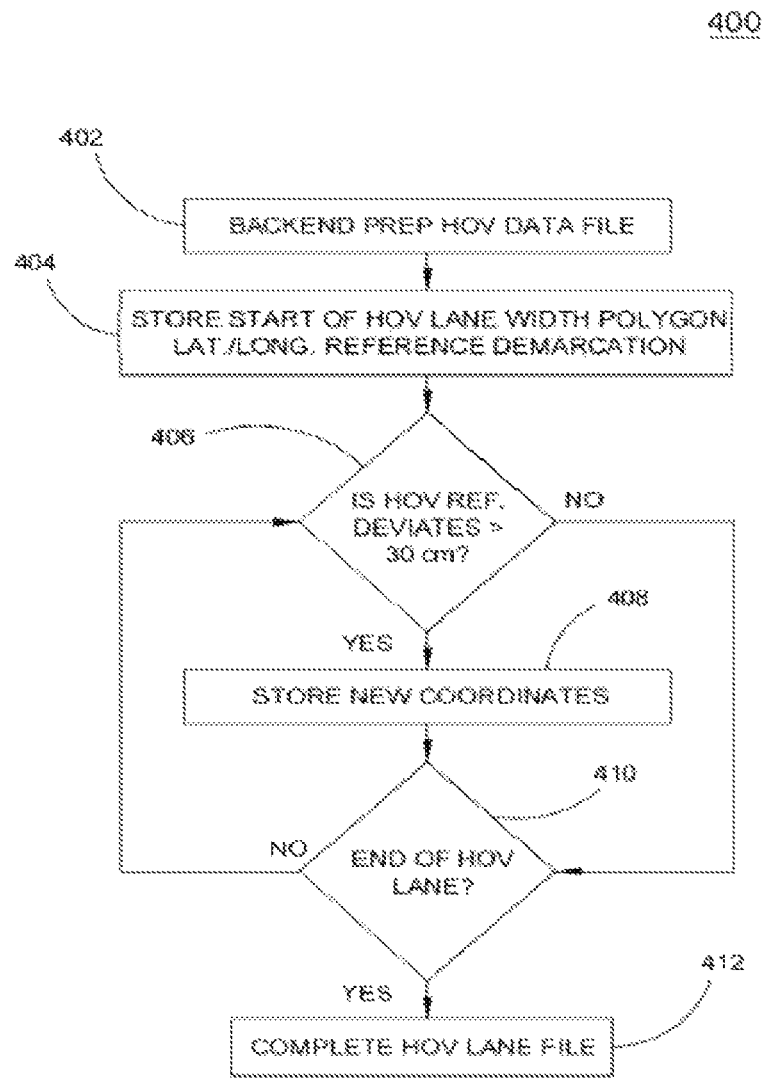
FIG. 4 is a flow chart diagram of a method for High accuracy GPS data file tracking preparation backend algorithm, in accordance with some embodiments.

FIG. 4 is a flow chart diagram of a method 400 for high accuracy GPS data file tracking preparation backend algorithm, in accordance with some embodiments. Specifically, the method 400 illustrates embodiments for creating/defining location polygons corresponding to real physical features such as HOV and tolling traffic lanes on a roadway. At the start 402 the method 400 can prepare a data file or record that will include defined location polygons for a given roadway feature, such as a HOV/tolling lane. The mapping can be created from, for example, high resolution satellite photographs, survey diagrams, certified traffic diagrams, and other sources with reliable, accurate location information.

At step 404 the start of a HOV/tolling lane can be identified, including a lane width between two points of latitude and longitude coordinates that will form vertices of a location polygon and the initial demarcation of the location polygon being defined. Generally it is assumed that the traffic lane continues in a straight direction, thus, in step 406, the method 400 looks for a deviation in the traffic lane from a straight line from the initial vertices/coordinates. If there is more than a threshold deviation from the straight line (e.g. 30 centimeters), then a new vertex can be defined in step 408, where new coordinates can be entered to indicate the end of one location polygon and the beginning of another. In step 410 the method 400 determines whether the end of the HOV/tolling lane being defined has been reached, and if so, the method 400 proceeds to step 412 in which the data file is completed and ready for distribution. The completed data file will include location data sets defining one or more location polygons that correspond to the physical location of traffic lane on a roadway. These location polygons can be used, for example, in method 200 for determining a toll to be charged for driving in a HOV/tolling lane.

Figure 5:
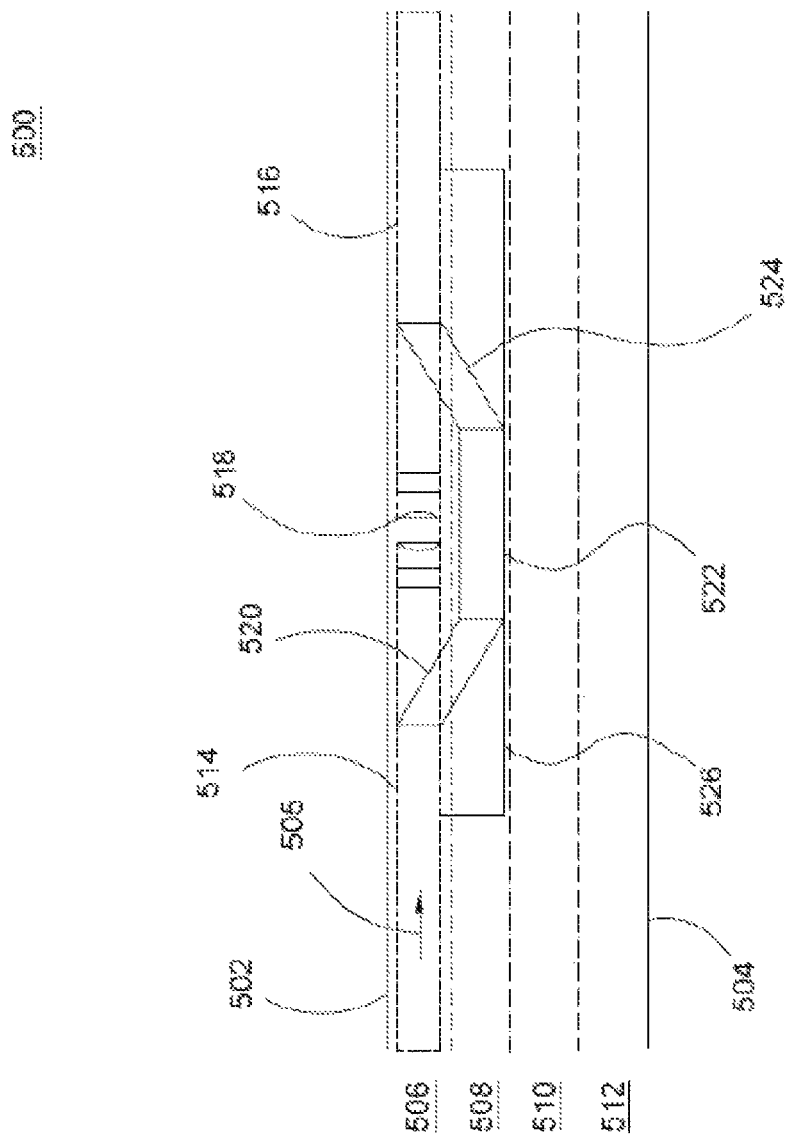
FIG. 5 is a location polygon mapping showing a temporary deviation from a defined HOV/tolling lane due to an obstacle, in accordance with some embodiments.

FIG. 5 is a location polygon mapping 500 showing a temporary deviation from a defined HOV/tolling lane due to an obstacle, in accordance with some embodiments. A roadway is bounded on a left side 502 and a right side 504, and includes several traffic lanes 506, 508, 510, 512, with traffic moving in the direction of arrow 505. Traffic lane 506 is defined as a HOV/tolling lane, and a location polygon 514 is used by tolling application programs on user equipment (e.g. cellular phone devices or similar computing devices used in a vehicle). Ordinarily the location polygon 514 would continue along traffic lane 506 but, in this example, an obstacle such as an inoperative vehicle 518 is blocking traffic lane 506. As a result, location polygon 514 is essentially broken, and continues in a second portion 516 on the other side of the vehicle 518. Since it can be a violation to leave a HOV/tolling lane, temporary location polygons can be defined to allow vehicles in traffic lane 506 use the adjacent traffic lane 508 to go around the inoperative vehicle 518. For example, location polygons 520, 522, 524 can be defined around the inoperative vehicle 518 that will be considered as defining a temporary HOV/tolling lane deviation. Note that polygons 520 and 524 overlap polygon portions 514, 516 indicating that location polygons do not need to be exclusive. Similarly, as an alternative, an adjacent rectangular polygon 526 that is near or against or overlapping location polygon 514/516 can be used.

When a temporary location polygon is used, a notice can be pushed out from the server to user's in the vicinity of the incident. In some cases the cellular phone device, as controlled by the tolling application program, may receive the notice, or periodically check for such notices, and upon detecting such a notice, download the temporary location polygon mapping for use in ensuring that the vehicle has not exited the HOV/tolling lane by going around the inoperative vehicle (or other obstacle) 518.

Similarly, toll users who have not entered the HOV/tolling lane 506, such as those driving in traffic lane 508, will not be charged a toll or violation for driving through the temporary location polygons 520, 522, 524 or 526. By being designated as temporary location polygons, they will only apply to vehicles that had previously entered polygon 514. However, if the vehicle then enters polygon portion 516, then the vehicle can be considered to have entered the HOV/tolling lane, and any violation or additional charge may be applied. It can be observed by those skilled in the art this is a flexible way to virtually and rapidly set HOV/tolling lanes not constraint by the infrastructure cost.

Figure 6:
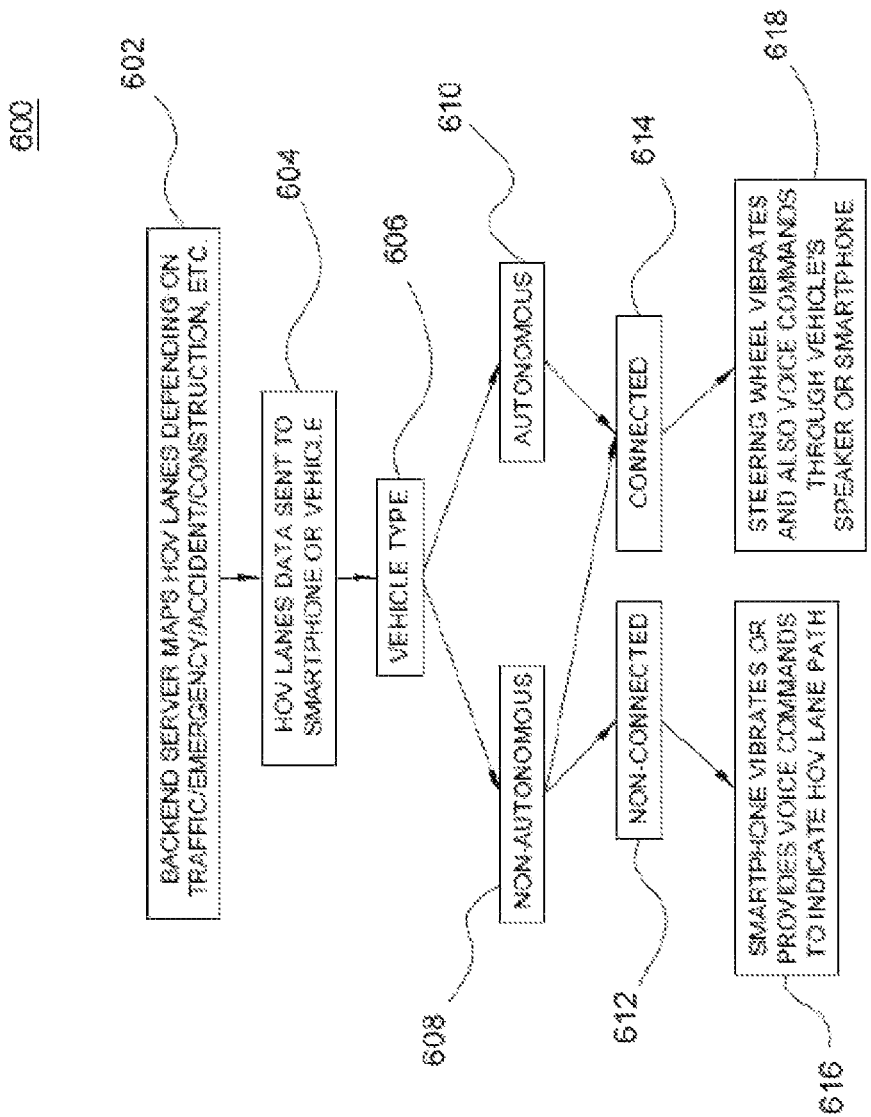
FIG. 6 is a flow chart diagram of a method of alerting an operator of a vehicle in a defined HOV/tolling lane that there is a deviation in the defined HOV/tolling lane, in accordance with some embodiments.

FIG. 6 is a flow chart diagram of a method 600 of alerting an operator of a vehicle in a defined HOV/tolling lane that there is a deviation in the defined HOV/tolling lane, in accordance with some embodiments. The method 600 is commenced when there is an obstacle blocking (or construction) a defined HOV/tolling lane that requires a temporarily defined route around the obstacle, as in the example shown in FIG. 5. Thus, in step 602 the location of the obstacle is gathered at the backend server, and a map around the obstacle is selected. The location of the obstacle can come from reports, and does not need to be as precise as the edges of the roadway or lane demarcations. A starting point and ending point can be selected, and it can generally be assumed that vehicles in the obstructed lane will change over to the closest non-obstructed lane to go around the obstacle. Personnel working at the backend or in communication with the backend can select the regions that need to be routed around for reference to create the temporary location polygons. Once the temporary location polygons are created, then in step 604 they can be sent to vehicles (e.g. the cellular phone device or similar in-vehicle equipment). Or a notice can be sent to allow those devices to request the data if needed.

Once the temporary location polygons routing around an obstacle are received, then in step 606 the type of vehicle can be determined with respect to whether the vehicle is an autonomous vehicle (e.g. self-driving) or non-autonomous in steps 608, 610. An autonomous vehicle can be assumed to be connected to the cellular phone device or similar device, or even have such a device integrated into the autonomous vehicle. When the vehicle is a user-driven, non-autonomous vehicle that has a connection to the cellular phone device, or when the vehicle is an autonomous vehicle, then step 614 is followed to step 618, and the vehicle can indicate to the user that a temporary route is being followed to avoid the obstacle. Otherwise steps 612 to 616 are followed, and the cellular phone device will alert the user by, for example, vibrating an interior component (e.g. a steering wheel) or emitting an audible alert through the vehicle's audio system. In some embodiments voice prompts or commands can be issued over the vehicle's audio system as well.

Figure 7:
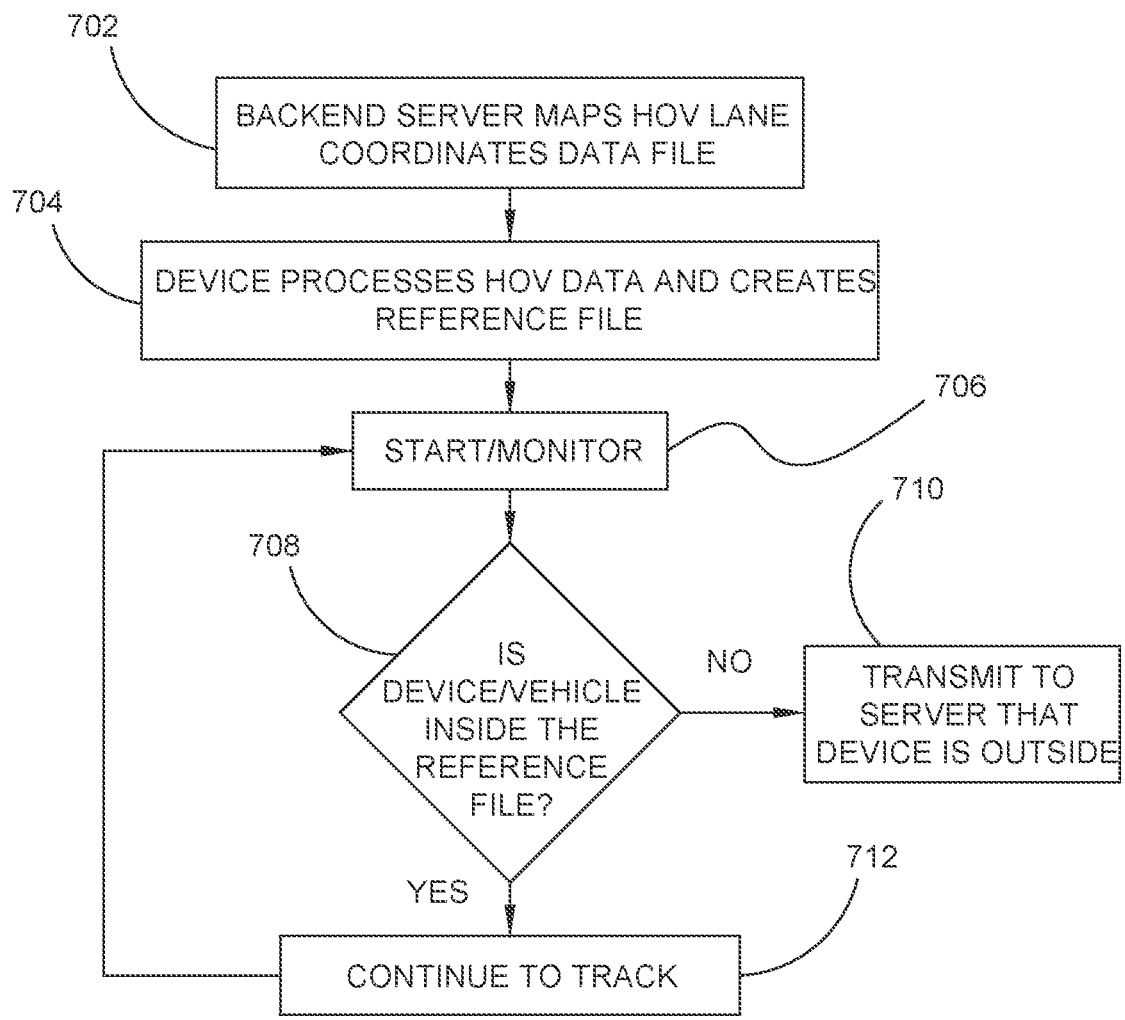
FIG. 7 is a flow chart diagram of a method for transmission of HOV/tolling lane data to reduce battery drain at the cellular telephone device, in accordance with some embodiments.

FIG. 7 is a flow chart diagram of a method 700 for transmission of HOV/tolling lane data to reduce battery drain at the cellular telephone device, in accordance with some embodiments. At the start 702 the backend server has created the maps of location polygons defining HOV and tolling lanes including location coordinates. The location polygon data can be transmitted to a user's cellular telephone device operating a tolling application. In step 704 the user's device can process the HOV and tolling lane data to create a reference file. The reference file is essentially a coordinate map arranging the coordinates of the location polygons so that a determined location reading can be compared to the reference file to quickly determine whether the determined location is inside or outside of the areas defined by the reference file. In step 706 the user's device commences monitoring its location and compares it to the coordinates in the reference file. In step 708 a present (or recent) set of coordinates is compared to the reference file. If the location is outside of any HOV or tolling lane, then in step 710 the user's device can transmit an indication to the backend server that the device is outside of any HOV or tolling lane, and reduce the cellular unit battery drain by reducing the GPS transmission rate. If in step 708 the location is within the coordinates mapped by the reference file, then the device will continue to track the location in step 712.

Figure 8:
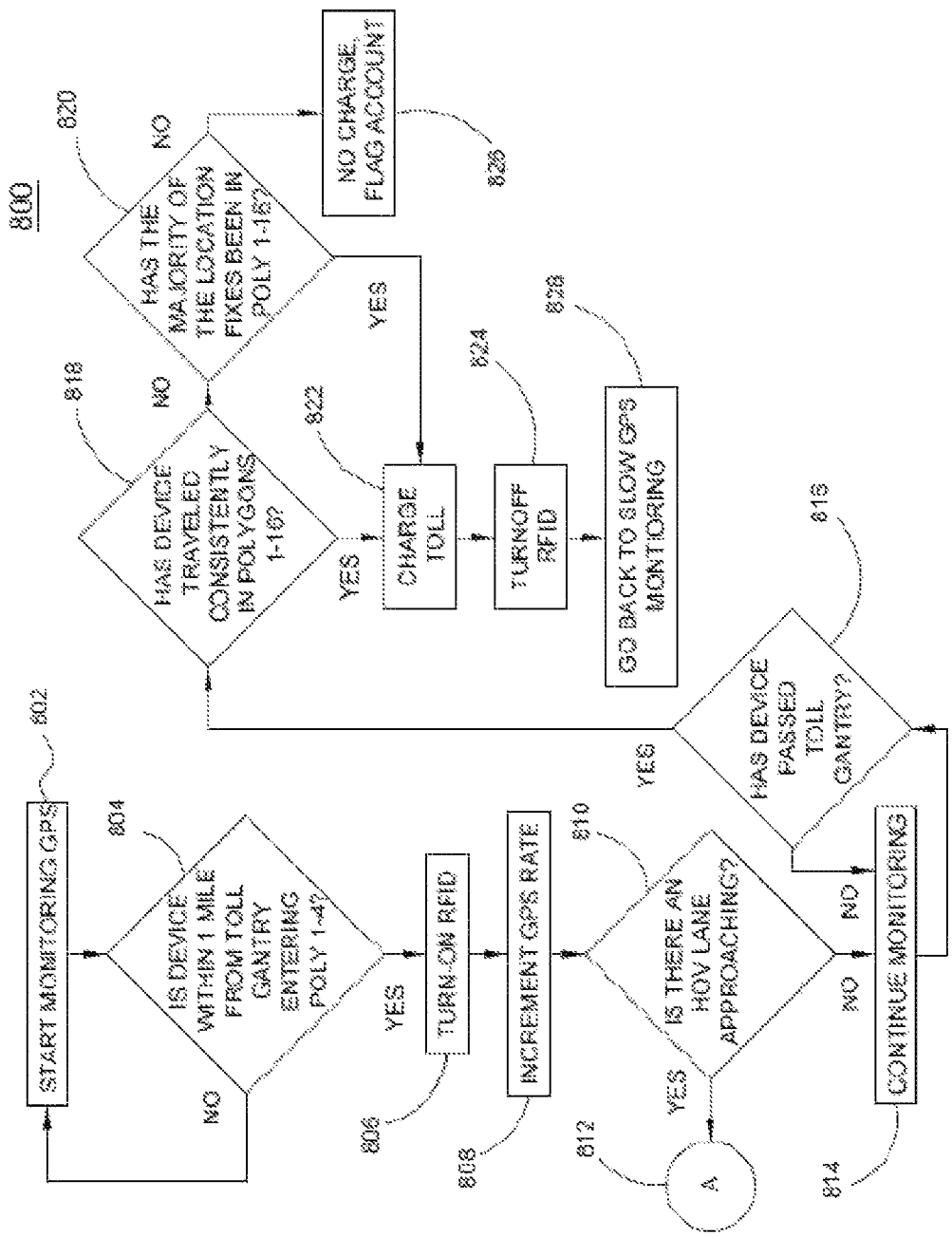
FIG. 8 is a flow chart diagram of a method for determining a toll charge for either a HOV or a tolling traffic lane, in accordance with some embodiments.

FIG. 8 is a flow chart diagram of a method 800 for determining a toll charge for either a HOV or a tolling traffic lane, in accordance with some embodiments. In particular, method 800 is suitable for use with conventional GPS operation (i.e. not the L5 signal). Conventional cellular phone devices have GPS chipsets that use the L1 GPS signal, which is less precise than the L5 signal. Furthermore, in some embodiments the cellular phone device can be wirelessly connected via a PAN to a toll transponder device, which is also read by a toll reader in a gantry at a tolling location. Location polygons can be used, but some accommodation is necessary in view of the inherent inaccuracy of the L1 signal. Location polygons are defined for longer stretches before a tolling location and after the tolling location to ensure a proper detection of the approach and passing of a tolling location. Multiple location polygons of selected lengths can be used, rather than long polygon of lengths determined by the straightness or curve of a roadway. When long location polygons are used the cellular phone device tracks its travel through the location polygon. Shorter location polygons are used for statistical averaging by counting the number of location polygons through which the vehicle has appeared to travel. Because of the inherent inaccuracy of the L1 signal, it can appear that a vehicle has travelled through a majority, although not necessarily all of the location polygons along a traffic lane to which the location polygons correspond.

Figure 9:
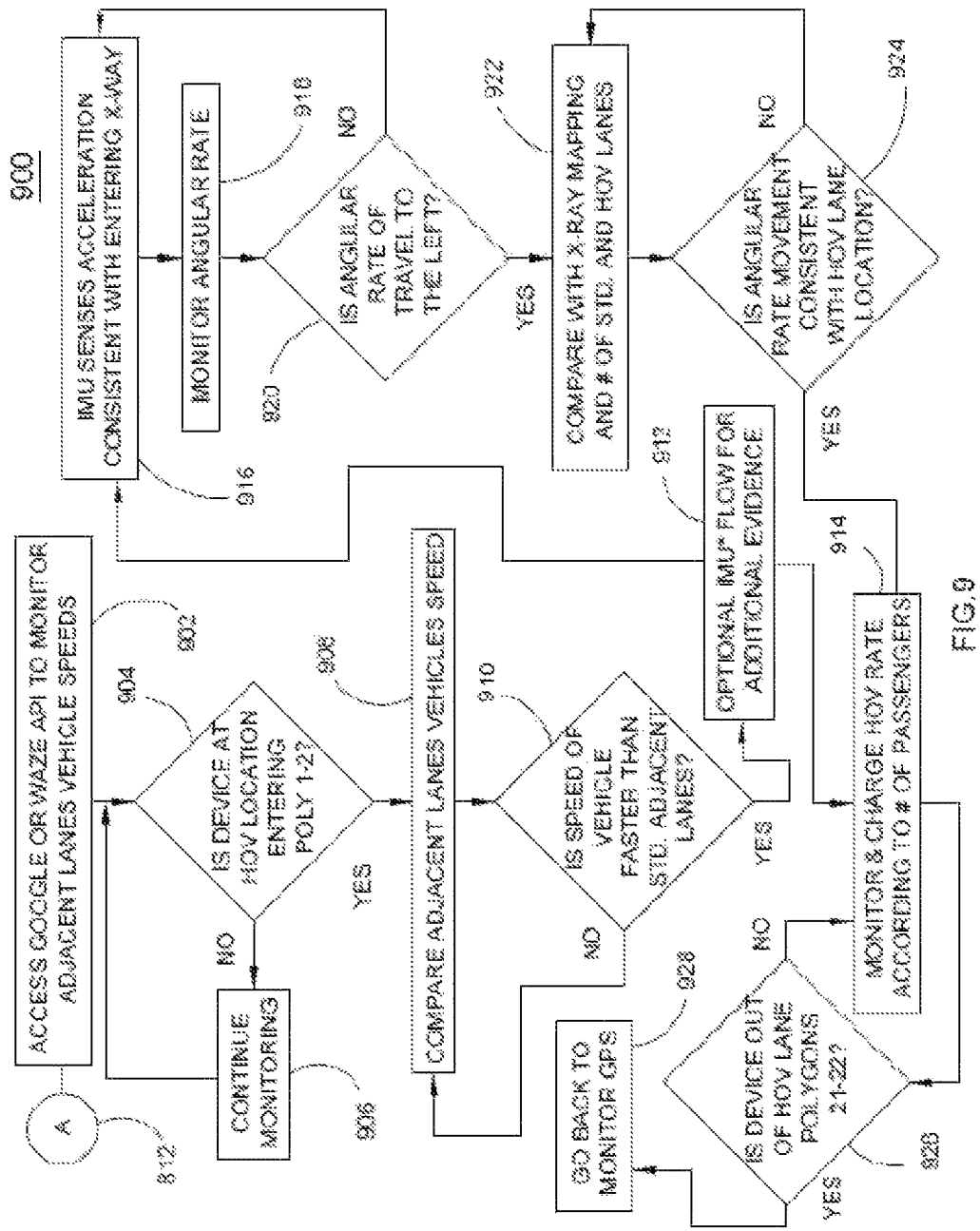
FIG. 9 is a flow chart diagram of a continuation of the method in FIG. 8, in accordance with some embodiments.

In step 802 the method 800 commences by the cellular phone device routinely monitoring its location. The location fixes can be taken at relatively large intervals of time (e.g. 5-10 seconds or more). Once location monitoring has begun then in step 804 the method 800 determines whether the present location is within a threshold distance from a tolling location (e.g. a toll gantry) based on whether it has entered a space corresponding to any of several initial location polygons defined along the traffic lane ahead of the tolling location. Once the location of the vehicle is found to be in close proximity to the several initial location polygons, then the method proceeds to step 806 where the cellular phone device (or device making the location determinations) activates the tolling RFID of the toll transponder, and in step 808, the rate of GPS location determination can be increased. In step 810 the method 800 determines whether there is an HOV lane approaching in addition to the tolling location. The HOV lane can be a lane through the tolling location that provides a toll discount for qualifying vehicles. If there is an HOV lane through the tolling location then the method 800 proceeds to another section ("A") that is shown in FIG. 9. When no HOV lane is present in the tolling location, the method proceeds to steps 814 and 816 to determine when the vehicle has passed through the tolling location by continuing to monitor location (i.e. produce new location determinations). Once the vehicle appears to have passed the tolling location the method proceeds to step 818 where a determination is made as to whether the vehicle passed through locations that fall within the defined location polygons before and after the tolling location. In the present example, there can be a total of sixteen location polygons. If the vehicle location has passed through all of the location polygons before and after the tolling location, then in step 822 a toll is charged, and in step 824 the toll transponder can be turned off, followed by resuming a less active location monitoring regime in step 828.

However, if in step 818 it is determined that less than all of the location polygons were traversed by the determined locations of the vehicle, then the method proceeds alternatively to step 820 in which it is determined whether a threshold number of location polygons were traversed (e.g. a majority). If the minimum number of location polygons were traversed by the vehicle, then the it is assumed the vehicle did pass through the tolling location. If less than the minimum number of location polygons defined before and after the tolling location along the roadway passing through the tolling location were traversed by the vehicle, then it may be that the vehicle only passed near the tolling location (e.g. on a service road or other adjacent roadway not subject to a toll), and the method then proceeds to step 826 where no toll is charged, but a flag may be set on the account for further inquiry, such as examining photo records at the tolling location to see if the vehicle did pass through the tolling location, as is common.

FIG. 9 is a flow chart diagram of a continuation of the method in FIG. 8, in accordance with some embodiments. Specifically, at point "A" 812, where there is a special HOV lane through a tolling location present. There are several characteristics of these HOV lanes through tolling locations that can be used under low accuracy GPS conditions to detect whether the vehicle is entering and using the HOV lane or not. For example, in many places the HOV lane is a special lane that starts before the tolling location as an offshoot from a far left (or far right in British or British legacy regions) traffic lane. After passing through the tolling location the HOV traffic may merge back into a regular traffic lane. As such, there can be a deviation detected. Furthermore, traffic in the HOV lane often moves faster than traffic in the other lanes through a tolling location, particularly if there are stop and pay toll booths at the tolling location.

Accordingly, to help determine whether the vehicle is accessing an HOV lane (or any special lane), in step 902 the tolling application program on the user's cellular phone device can access real time traffic data from other traffic related application programs, such as, for example, Google location, Waze, and similar applications on which other user's share their traffic data, including present speed and location. In step 904 the method determines whether the vehicle has entered the initial location polygons defined ahead of the tolling location. The method cycles iteratively through steps 904 and 906 until the vehicle enters and passes through the initial location polygons. In step 908 a comparison is made of the vehicle's speed, or the lane speed of the lane in which the vehicle is travelling, to that of other vehicles in adjacent lanes, assuming such information is available in step 902. If the vehicle is going faster than nearby vehicles, then it can be assumed that the vehicle is using the special or HOV lane and proceed to steps 912 and 914. Step 912 is an optional step that can be used to augment detection of entering a special or HOV lane based on inertial measurements provided by, for example, an accelerometer unit in the cellular phone device, if the cellular phone device includes such a unit. For example, in step 916, the cellular phone device can detect acceleration as the vehicle passes through location polygons ahead of the tolling location. Furthermore, the angular rate of change can be monitored as well (assuming the cellular phone device is not being moved within the vehicle) in step 918. If the angular rate of travel is determined in step 920 to be to the left (or right in British or British legacy countries), then the method can proceed to step 922. In step 922 the number of standard and HOV lanes are examined along with the general direction of the roadway to determine if the angular rate of change is consistent with a lane change to an HOV lane or whether it is consistent with staying along a defined traffic lane. In step 924 if the comparison of step 922 indicates a lane change to a special or HOV lane then the method proceeds to step 914, as would be the case if step 912 is skipped or not applicable. In step 914 the user is charged a toll based on the HOV status of the vehicle (e.g. number of occupants). From step 914 the method proceeds to step 926 in which the method monitors whether the vehicle has passed through the last location polygons beyond the tolling location, and if so, then in step 928 the method resumes ordinary location determination operation as in step 928. Likewise, lane to lane changes can be detected using the GPS bearing difference, as shown in FIG. 15, by detecting the peaks and valleys for the respective lane changes to the right or to the left.

Figure 15:
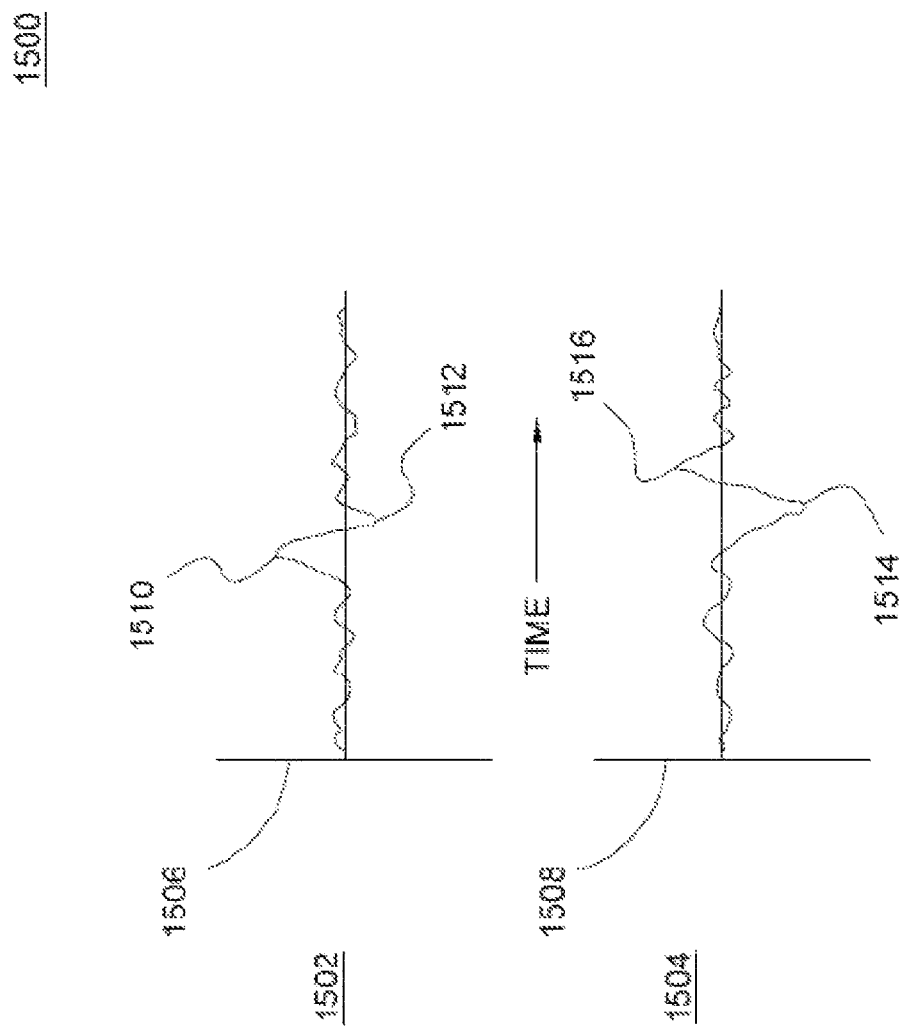
FIG. 15 is a graph chart diagram of the output of an inertial measurement unit and/or location detection data in a vehicle making left and right lane changes for use in determining if a vehicle has changed to an HOV or tolling lane, in accordance with some embodiments.

FIG. 15 is a graph chart diagram 1500 of the output of an inertial measurement unit in a vehicle making left and right lane changes for use in determining if a vehicle has changed to an HOV or tolling lane, in accordance with some embodiments. For comparison's sake, assume that for both charts 1502, 1504 the same orientation of the cellular phone device or other device performing the inertial sensing is used. In the first chart 1502 the inertial sensor output can indicate a leftward lane change, and in the second chart the inertial sensor output can correspond to a rightward lane change. The vertical axes 1506, 1508 indicate an inertial change magnitude. In the present example positive-going transitions indicate a change to the left while negative-going transitions indicate a change to the right. In both graph plots time increases towards the right of the page. In real applications the inertial measurement system can dynamically identify "left" and "right" based on the direction of gravity and by sensing forward motion. Thus, a cellular phone device placed face down can initially determine the direction of left and right relative its orientation, and upon being turned over it can re-calibrate the left and right directions. The curve plotted on each of the charts indicates the general magnitude of directional changes as indicated by, for example, accelerometer output. Similarly, the graph chart diagram 1500 may be derived from location data calculating the GPS Bearing Difference in Time (GBDT) defined in degrees, and obtained from the location detection data provided by the cellular phone.

In chart 1502 there is initially a positive-going excursion 1510 consistent with going to the left, followed by a negative going excursion 1512 consistent with going to the right, as would be the case with a left-ward lane change. In the chart 1502 the negative excursion immediately follows the positive excursion, but there can be a delay between them, such as would occur, for example, if the vehicle crossed several lanes. Likewise, in chart 1508, there is first a negative-going excursion 1514 followed by a positive-going excursion 1516 consistent with a rightward lane change. These outputs coupled with the use of location polygons can allow a determination as to whether a vehicle is entering (or exiting) a specific traffic lane that may result in a toll or other charge.

Figure 16:
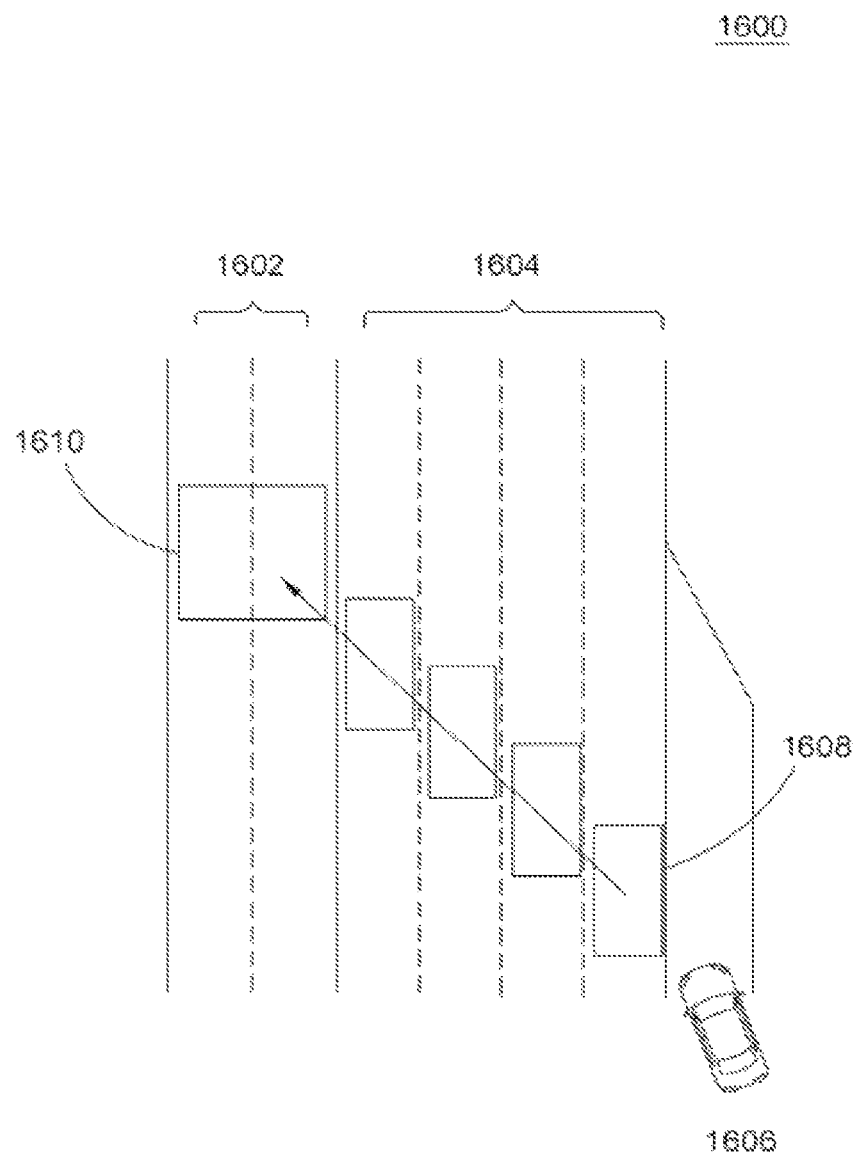
FIG. 16 is a traffic diagram shown a lane change by a vehicle to an express lane being detected using inertial measurement and/or location detection data, in accordance with some embodiments.

FIG. 16 is a traffic diagram shown a lane change by a vehicle to an express lane being detected using inertial measurement and/or location detection, in accordance with some embodiments. An expressway is comprised of two HOV lanes 1602, and several regular toll lanes 1604. A vehicle 1606 is shown entering the expressway. The vehicle 1606 can cross the regular toll lanes 1604 to get to an HOV lane 1602. Lane crossings can be detected based on location and/or inertial measurements. A series of polygons starting with polygon 1608 and ending with polygon 1610 can represent points of lane crossings that are detected by the inertial measurement system. The drawing is shown compacted for clarity, and the actual lane crossings would occur over a much larger relative distance than it appears in the drawing. The inertial detection can be made by the output of an inertial measurement system output similar to that of chart 1502 with one or more instances of the positive excursion followed by a negative excursion. The duration between the positive and negative excursions, as well as the number of instances of couplets of positive-negative excursions can be used to count the number of lanes being crossed. The rate of change of an excursion can be used to estimate the rate of lane changing as well. Thus, the determination of lane changes can be used to determine that the vehicle 1606 has crossed the regular toll lanes 1604 and is in a HOV lane 1602, which can be confirmed by location detection, including the use of location polygons corresponding to the location of the expressway lanes.

Figure 17:
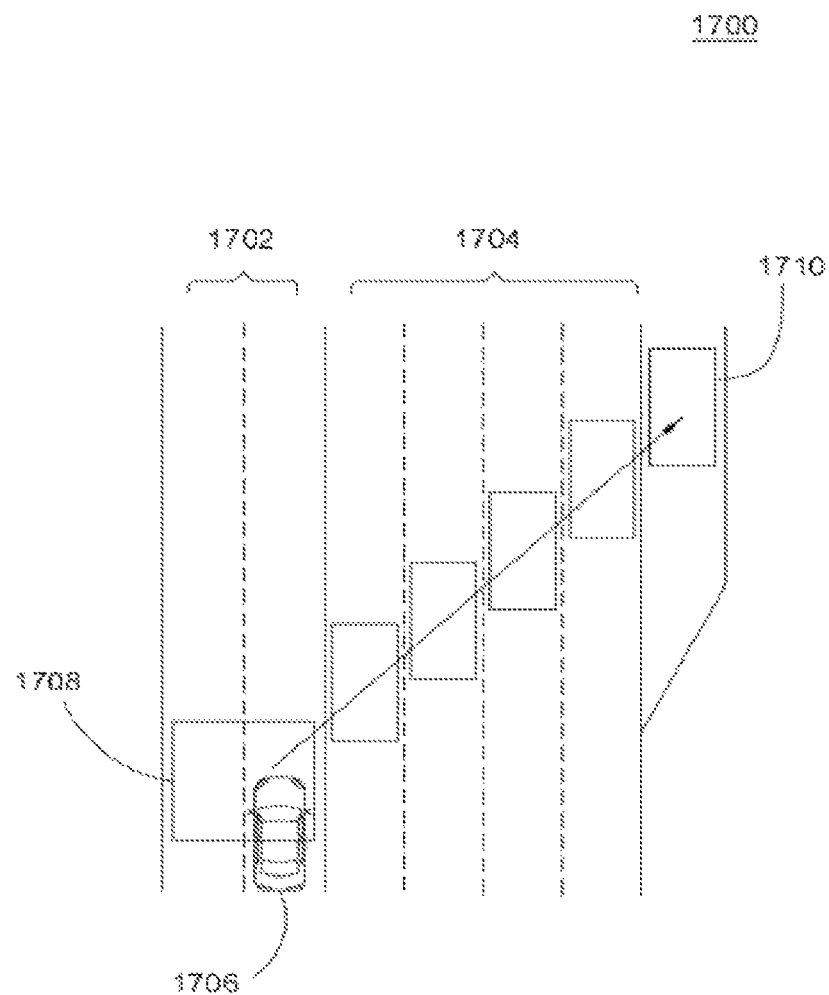
FIG. 17 is a traffic diagram shown a lane change by a vehicle to an exit lane from an express lane being detected using inertial measurement and/or location detection data, in accordance with some embodiments.

FIG. 17 is a traffic diagram 1700 shown a lane change by a vehicle to an exit lane from a HOV lane and an expressway being detected using inertial measurement and/or location detection, in accordance with some embodiments. Similar to diagram 1600, here the vehicle 1706 is initially in one of the HOV lanes 1702 and crosses several regular toll lanes 1704 to exit the expressway. Lane changes indicated by a series of polygons starting with polygon 1708 and ending at polygon 1710 indicate a series of lane changes that can occur as the vehicle 1706 safely makes its way from the HOV lanes 1702 to the exit. The lane changes can be detected as indicated in chart 1504, where there is negative excursion followed by a positive excursion.

Figure 18:
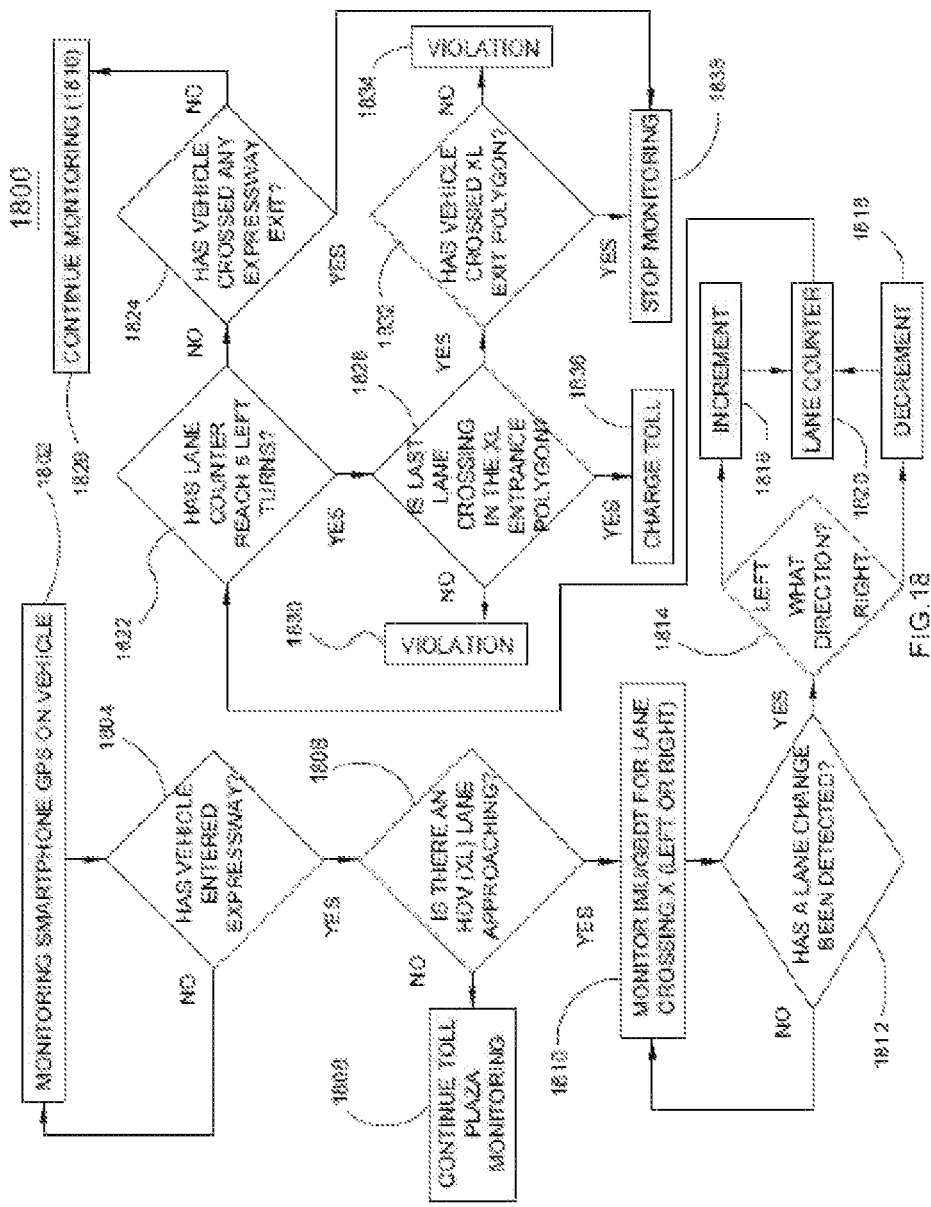
FIG. 18 is a flow chart diagram of a method for determining when a vehicle has entered or exited HOV or tolling lanes based on inertial measurement and/or location determination, in accordance with some embodiments.

FIG. 18 is a flow chart diagram of a method 1800 for determining when a vehicle has entered or exited a roadway including one or more HOV or tolling lanes based on inertial measurement and/or location determination, in accordance with some embodiments. The method 1800 can be used in the context of FIGS. 16-17 in determining lane changes by a vehicle on a roadway, and using an inertial measurement system or location bearing difference data having an output such as that exemplified in FIG. 15. At the start 1802 the cellular phone device can start monitoring location and inertial output (e.g. signal output by the inertial measurement system). In step 1804 a determination is made as to whether the vehicle has entered an expressway, which can be made using defined location polygons as described herein. In step 1806 a determination can be made as to whether there is a HOV lane ahead, and if there is not, then normal tolling location monitoring is then followed in step 1808.

However if, in step 1806, it is determined than there is a HOV lane ahead, then in step 1810 the output of the inertial measurement system can be monitored to detect lane changes by looking for excursions indicating left or right movement. Alternatively, or conjunctively, the GPS bearing information can be determined to derive changes in direction. In step 1812 the method 1800 looks for indications of a lane change in the output of the inertial measurement system. If a lane change is indicated, then in step 1814 a determination is made as to the direction of the lane change, either left or right. A lane counter can be used to indicate a present lane in which the vehicle is travelling. The lane counter can be a variable maintained in memory by the cellular phone device. Thus, for left-going lane changes in step 1816 the lane counter is incremented, and for right-going lane changes in step 181 the lane counter is decremented. The lane counter is maintained in step 1820. In step 1822 a determination is made as to whether the vehicle has crossed enough lanes to be in an HOV lane, as well as whether the vehicle has passed through location polygon corresponding to the HOV or express lane entrance. In step 1824 the method 1800 determines whether the vehicle has crossed an exit, and if not then the monitoring continues (return to step 1810). If in step 1822 the vehicle has crossed enough lanes to be in an HOV lane, then in step 1828 a determination is made as to whether the last lane crossing occurred prior to or at the location corresponding to the entrance location polygon of a set of location polygons defining the HOV lane. If not, then it means the vehicle has improperly entered the HOV lane and a violation may be assessed in step 1828. If the vehicle did properly enter the HOV lane, then two actions are taken. First, in step 1836, and toll can be charged. Second, in step 1832 the method monitors to ensure that the vehicle properly remains in the HOV lane by determining whether the vehicle has changed lanes to the right before passing a location polygon indicating the end of the HOV lane. If a right-going lane change occurred, and in step 1832 it occurred prior to the vehicle passing through the location defined by an exit location polygon, then a violation may be assessed in step 1834. If the exit location polygon was passed prior to the right-going lane change, then the HOV lane monitoring process is finished in step 1838. Those skilled in the art will appreciate that, although the flow chart diagram suggests a linear flow, the various blocks/steps can represent processes that can occurs in parallel. For example, in steps 1828 and 1832, the method 1800 can still detect lane changes in step 1810 and increment or decrement the lane counter 1820.

In addition to tolling and HOV lane monitoring, the use of location polygons can be applied to numerous other applications. Some other applications considered here include parking, road use charging, and retail drive-up delivery. Other applications within the scope of the disclosed embodiments may further occur to those skilled in the art.

Figure 10:
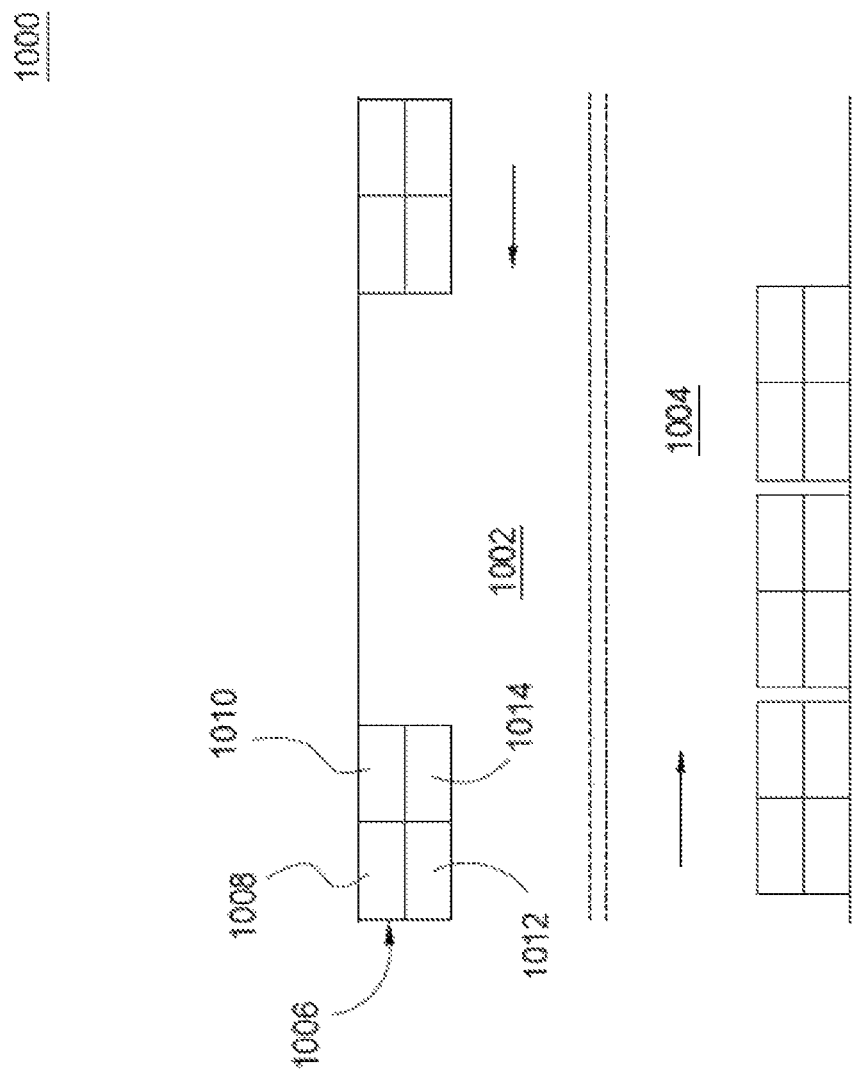
FIG. 10 is a plan view of street having defined physical parking spaces and defined virtual location polygons corresponding to the physical parking spaces for a parking application, in accordance with some embodiments.

FIG. 10 is a plan view 1000 of street having defined physical parking spaces and defined virtual location polygons corresponding to the real (physical) parking spaces for a parking application, in accordance with some embodiments. The street can include a first traffic lane 1002 and a second traffic lane 1004. As shown here traffic lanes 1002 and 1004 have opposing traffic flow, but they can also have the same direction of traffic flow. Along the sides of the street are several defined parking spaces such as parking space 1006. Each parking space can be physically demarcated by, for example, paint stripes on the surface of the roadway, as is known. Each parking space is mapped for its location coordinates so that the locations of each parking space can be represented virtually by one or more location polygons such as location polygons 1008-1014 shown overlaid on parking space 1006. In a parking application, the location of the vehicle in any of the defined location polygons 1008-1014 can be used to assume that the vehicle is in the physical parking spot corresponding to the location polygons 1008-1014, and the same is true for the other parking spaces and their corresponding location polygons. The location coordinates can include an elevational component in the case of parking garages where there can be parking on multiple floors of the parking garage.

Figure 11:
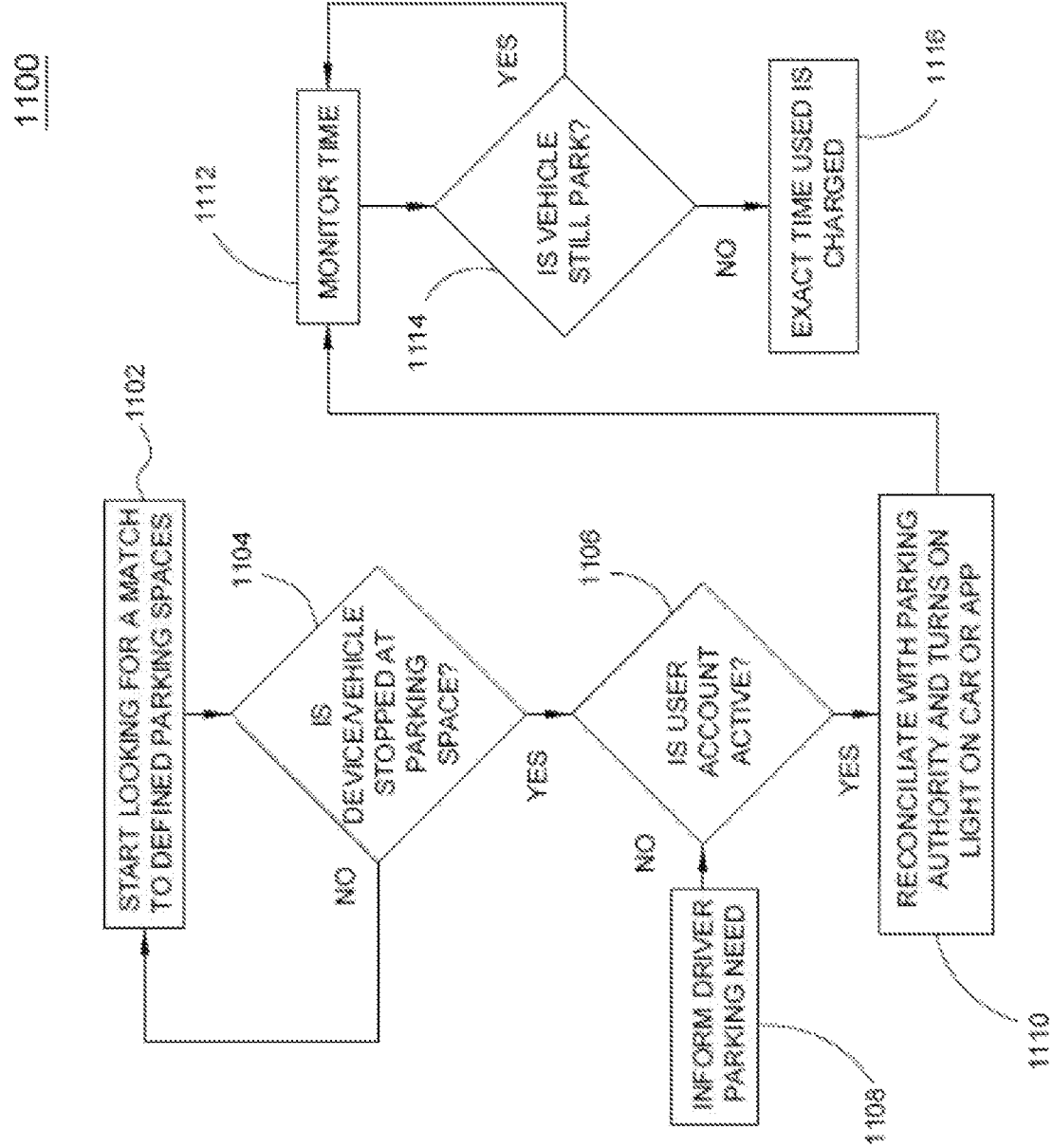
FIG. 11 is a flow chart diagram of a method of operating a parking application using location polygons, in accordance with some embodiments.

FIG. 11 is a flow chart diagram of a method 1100 of operating a parking application using location polygons, in accordance with some embodiments. The method 1100 can operate in the context of the plan illustrated in FIG. 10, where parking spaces are physically defined and mapped with respect to their coordinates, and location polygons are defined for use by a tolling or parking application program for determining whether a vehicle is in a defined parking space. A localized map can be loaded or the vicinity of the vehicle location that defines parking spaces in the area around the vehicle location. Thus, in step 1102 the method 1100 commences looking for a match to a defined parking space by comparing the location of the vehicle, as determined by GPS on a cellular phone device in the vehicle, for example, with location polygons corresponding to defined parking spaces near the location of the vehicle. In step 1104 the method 1100 determines whether the vehicle is stopped in a defined parking spot by determining that the vehicle is no long moving, and that the vehicle location is within a defined location polygon. In step 1106 the method 1100 can optionally determine whether the user has an active parking or toll account (and if not, then in step 1108 the method 1100 caused the user to be notified). In step 1110 the parking or toll application can communicate with a backend server to arrange for the parking fee to be paid from the user's account, and an indicator can be activated in the vehicle or the cellular phone device to indicate that the vehicle is properly parked and payment will be accepted to avoid a parking violation. In steps 1112 and 1114 the amount of time the vehicle is parked in the parking space is monitored, and when the vehicle leaves the parking space in step 1114 then in step 1116 the parking charge or fee is assessed based on the amount of time spent in the parking spot. The parking spaces mapped by location polygons can be either public or private parking (e.g. parking garages). The use of location polygons and the described system eliminates the need for a user to enter a specific parking space number, for example, since the location of the parking space is defined and known.

Figure 12:
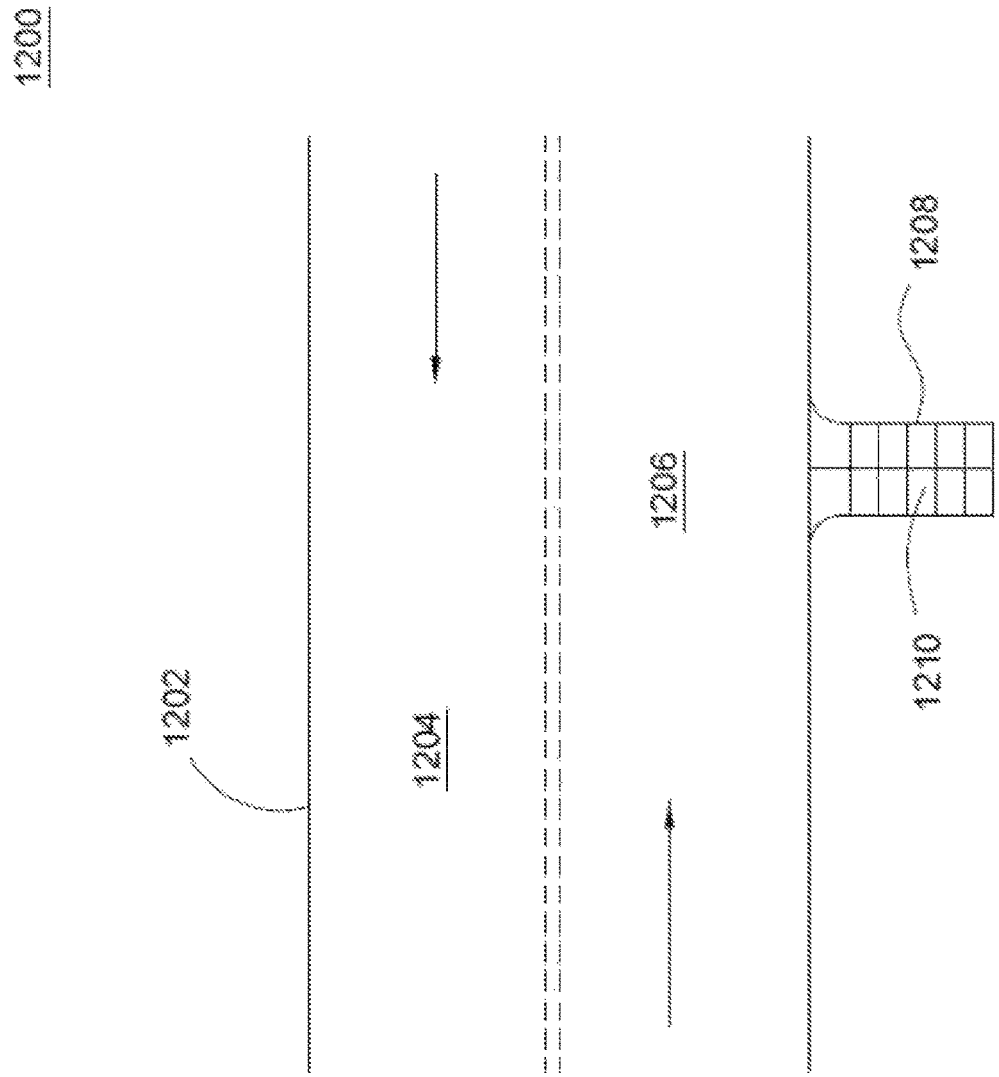
FIG. 12 is a plan view of a public street or roadway to which a private street or roadway joins where location polygons are used to define the private roadway to avoid a road use charge when a vehicle is on the private roadway, in accordance with some embodiments.

FIG. 12 is a plan view of a public street or roadway 1202 to which a private street or roadway 1208 joins where location polygons are used to define the private roadway to avoid a road use charge when a vehicle is on the private roadway, in accordance with some embodiments. The public roadway 1202 can include one or more traffic lanes such as opposing traffic lanes 1204, 1206. In some jurisdictions it is contemplated that vehicle owners will be assessed a road usage charge or tax for driving on public roadways. This tax has traditionally been assessed indirectly by taxing fuel (e.g. gasoline/petrol). However, in recent years, vehicular technologies for fuel efficient engines, hybrid engines using electric motors in combination with an internal combustion engine, and electric vehicles have depressed the revenue normally collected as a fuel tax. Accordingly, and road usage charge is being considered, and implemented, in some places. However, driving on private roadways should not be included in a public road use charge. Accordingly, the private roadway 1208 can be mapped and have a plurality of location polygons 1210 defined in correspondence with the private roadway 1208. When vehicle is within any of the location polygons defined for the private roadway, no road use charge is accrued, and a road use charge is only accrued when the vehicle is on the public roadway 1202 (which can also be defined by location polygons). Alternatively, it is contemplated that only the public roadway can be defined by location polygons, and any time the vehicle is not over a public roadway location polygon then no road use charge is accrued.

Figure 13:
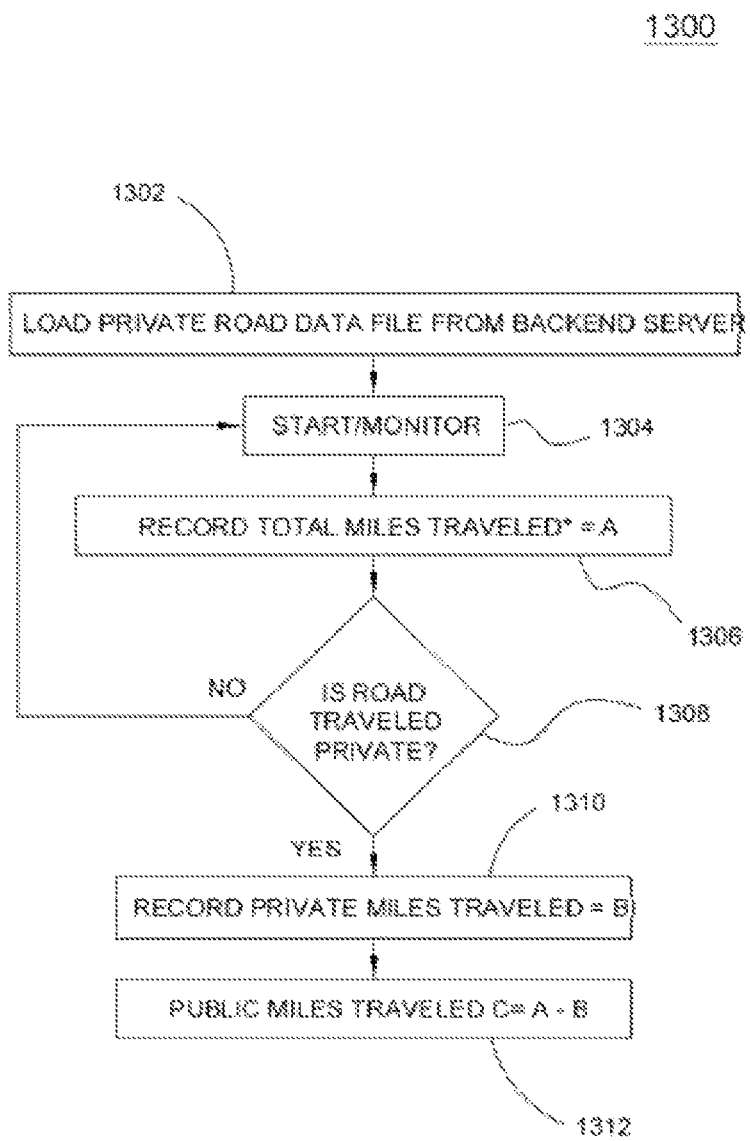
FIG. 13 is a method for determining a road use charge for a vehicle that travels on both public and private roadways, in accordance with some embodiments.

FIG. 13 is a method 1300 for determining a road use charge for a vehicle that travels on both public and private roadways, in accordance with some embodiments. Road use charges can be assessed by a transit authority or other governmental agency. Using the model of FIG. 12 as an example, in step 1302 the location polygon data for private and/or public roadways is loaded, at least for the region around the initial location of the cellular phone device or vehicle. The location polygons provide a map for area that included as private and public roadways. Private roadways are not used in determining road use charges. In step 1304 a road use charge application program monitors the present location of the vehicle and a total number of miles (or other unit of distance) driven is recorded. In step 1308 the method 1300 determines whether the present location, based on location polygons (or the absence of such) indicates that the vehicle is presently on a public or private road. In step 1310 the units of distance driven on private roads is recorded, and in step 1312 a road use charge can be calculate based on the distance travelled only on private roadways. Although shown here as a subtraction operation, it will be apparent to those skilled in the art that it is also possible to maintain a simple accumulator that is only incremented when the vehicle is driven on public roadways to determine a distance driven on public roadways.

Figure 14:
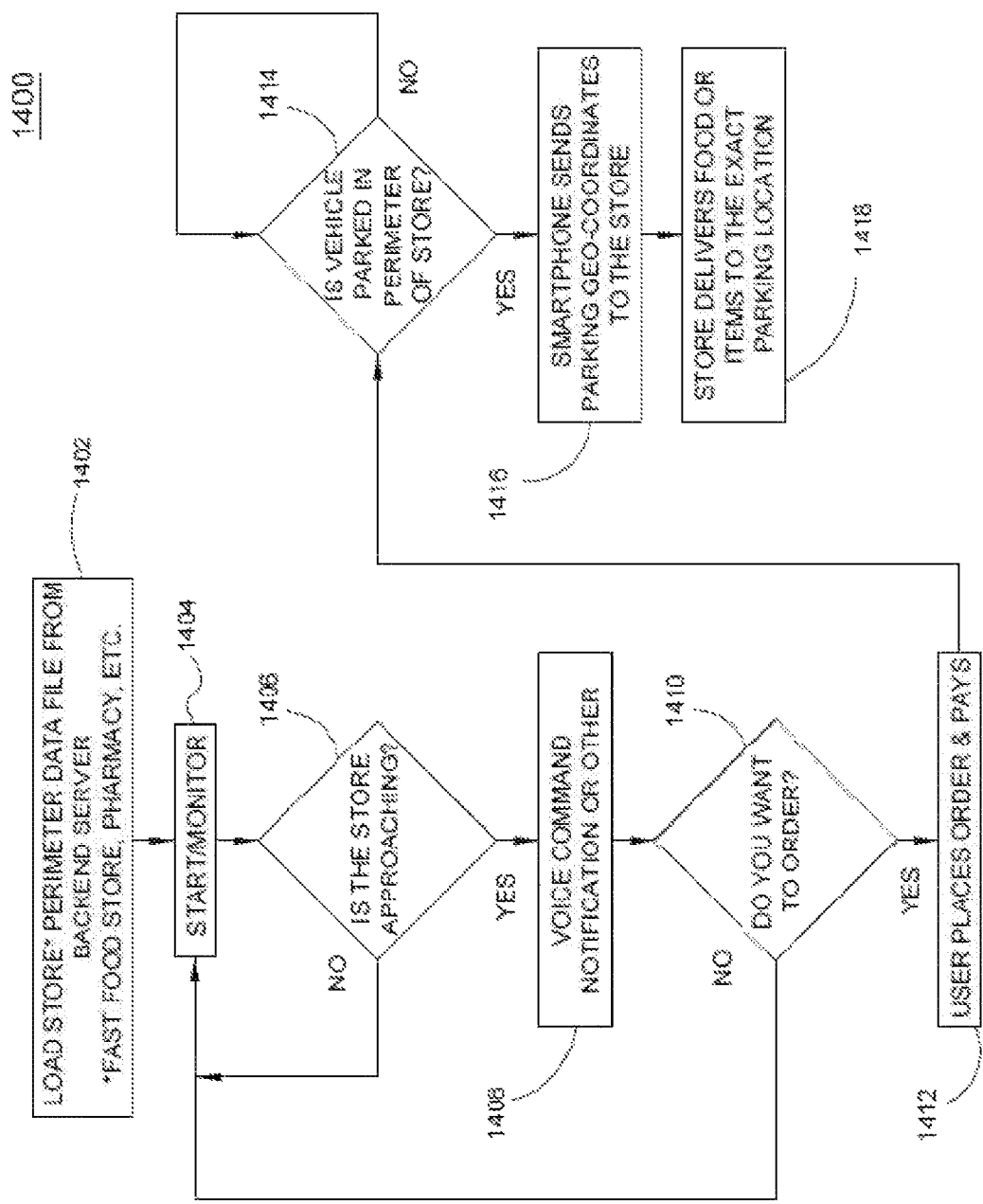
FIG. 14 is a flow chart diagram of a method for using location polygons in a drive-in retail delivery arrangement, in accordance with some embodiments.

FIG. 14 is a flow chart diagram of a method 1400 for using location polygons in a drive-in retail delivery arrangement, in accordance with some embodiments. The method 1400 is used at a retail location that has a parking lot or similar area where a vehicle can drive into and park. The parking spaces can be mapped with respect to their location coordinates, and defined by location polygons at a backend server, as with the examples given previously with respect to tolling locations, parking spaces, and road use charges. In step 1402 the location polygon data for a retail location can be loaded in the cellular telephone device or equivalent and the cellular phone device can then commence monitoring its location in step 1404 and compare its location with that of the retail location. In step 1406 the method 1400 makes a determination as to whether the vehicle is approaching a retail location. In step 1408 the cellular phone device, upon detecting that a retail location is sufficiently nearby, can issue a prompt or notification indicating the retail location is nearby. In step 1410 the cellular phone device can prompt the user as to whether the user want to place an order (or has placed an order). If the user wishes to place an order for the retail location, then in step 1412 the user can use the cellular phone device to place and pay for an order. In step 1414 the method 1400 determines whether the vehicle is parked in one of the defined parking spaces of the retail location. In step 1416, when the vehicle is in a designated or defined parking spot of the retail location, the cellular phone device can send the geo-location coordinates of the vehicle, or identify the parking space such as by a parking space number associated with the location polygons that define the parking space. In step 1418 retail personnel can deliver the ordered goods to the vehicle as indicated by the parking information associated with the order.

The method 1400 can used for a variety of retail services, including foodservice, pharmaceutical, and other goods. It is further contemplated that, rather than ordering while parked or at the retail location, a person can place an order prior to arriving at the retail location, and the detection of the vehicle in a parking space of the retail location can automatically trigger a message being sent to the retail location that includes, for example, an order number, the name of the person who placed the order, and the present parking spot in which the person is parked. In response to receiving the message, the retail location can verify the order and the identity of the person placing the order, and deliver the goods to the person in the indicated parking space.

Figure 19:
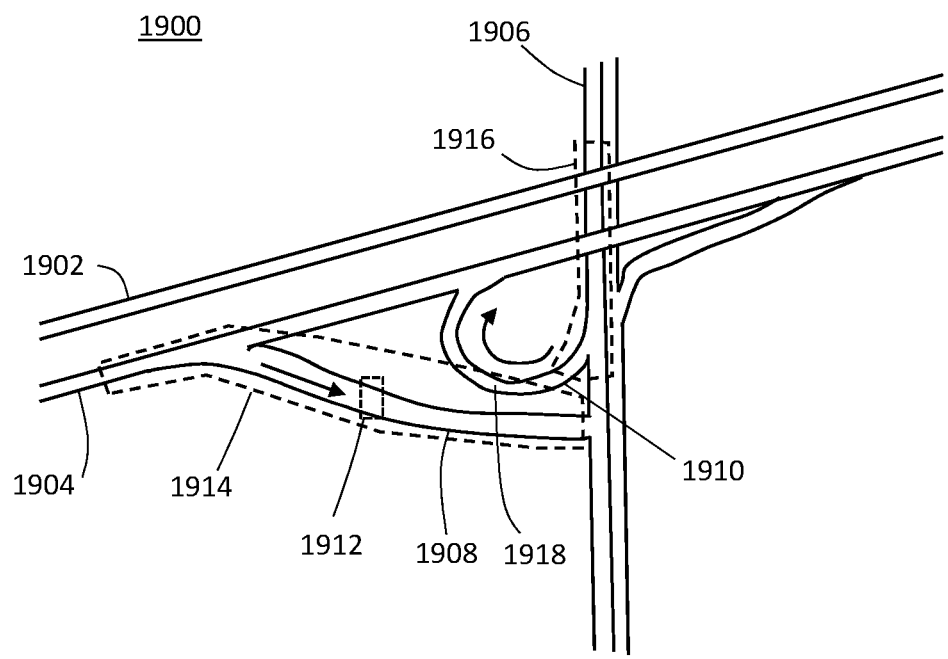
FIG. 19 is a roadway diagram showing geofenced regions indicating toll and toll-exclusion geofenced regions for determining whether to charge a toll, in accordance with some embodiments.

FIG. 19 is a roadway diagram 1900 showing geofenced regions indicating toll and toll-exclusion geofenced regions for determining whether to charge a toll, in accordance with some embodiments. The roadways include a restricted access roadway comprised of opposing lane portions 1902, 1904, with traffic on each lane portion going in one direction and traffic on the other lane portion going in the opposite direction. Each lane portion 1902, 1904 can include multiple lanes of traffic. A cross roadway 1906 passes under or over the restricted access roadway lane portions 1902, 1904. Lane portions 1902, 1904 can be toll roadways, where traveling on the lane portions 1902, 1904 requires payment of a toll. Tolling can be performed using a tolling application program running on a mobile device, such as a cellular phone device. The tolling application program uses location points to determine when to charge a toll. Toll points can be in defined geofenced regions. For example, a toll can be charged when a vehicle exits lane portion 1904 using exit ramp 1908, which meets cross roadway 1906. Traffic on cross roadway 1906 can enter the lane portion 1904 using an entrance ramp 1910. A virtual or actual toll point 1912 can be established such that when a vehicle passes the toll point, an account associated with the vehicle is charged a toll. However, given inaccuracies in location measurement, a substantial region needs to be defined as a toll region, which can include substantially the entire exit ramp 1908. A portion of the toll region geofence 1914 can overlap a portion 1918 of the entrance ramp 1910. Traffic leaving lane portion 1904 on exit ramp 1908 will pass through toll region 1914, and the tolling application program will determine that the vehicle was located in the toll region and charge a toll. Tolling can occur by a mobile device in the vehicle detecting its location in the geofence 1914, and passing point 1912, and communicating with a backend server (e.g. over the cellular terrestrial network and Internet) to report the event so that an account of the user can be charged accordingly.

Figure 26:
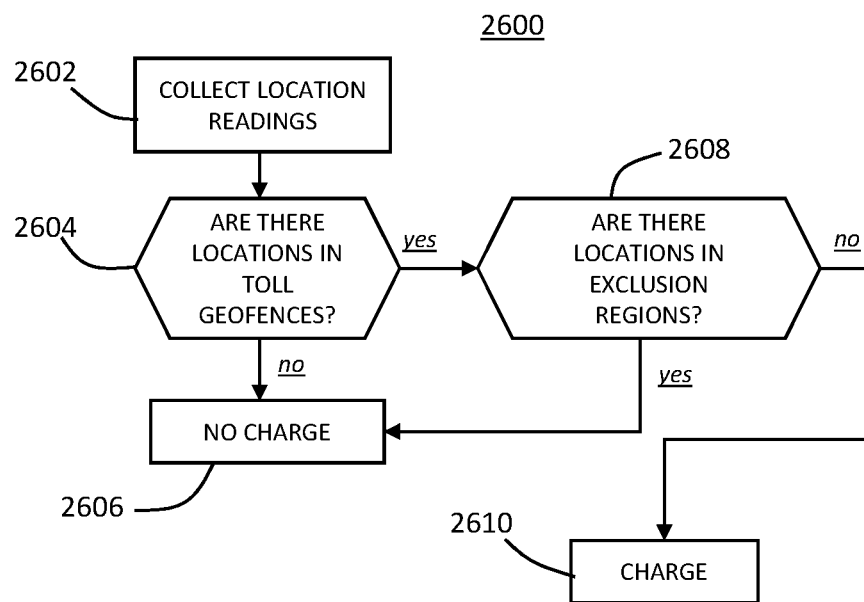
FIG. 26 is flow chart diagram of a method for determining whether to charge a toll based on whether the vehicle has passed through a toll exclusion geofenced region prior to a toll geofenced region, in accordance with some embodiments.

However, traffic on cross roadway 1906 entering lane portion 1904 via ramp 1910 will also pass through toll region 1914 in portion 1918 of the entrance ramp 1910. To prevent a toll being charged to traffic entering lane portion 1904 upon passing through portion 1918, a toll exclusion region 1916 is defined as a geofenced region. When a vehicle passes through toll exclusion region 1916, and then through toll region 1914, a toll is not charged. This is illustrated in FIG. 26, where a flow chart diagram of a method 2600 for determining whether to charge a toll based on whether the vehicle has passed through a toll exclusion geofenced region prior to a toll geofenced region, in accordance with some embodiments, is shown. In method 2600, at step 2602, the application program is collecting location fixes from the location hardware of the mobile device (e.g. GPS receiver subsystem). In step 2604 the application program can compare locations with the toll geofence region (e.g. 1914) and determine whether the vehicle which the mobile device is traveling was inside the toll geofenced region 1914 (or any other toll geofenced region). The definition of the toll geofenced region can be retrieved from a server by the mobile device, triggered by a general location determination by the mobile device. That is, the mobile device, using the tolling application program, can determine its general location, and retrieve a set of geofenced region definitions for use while in the vicinity of the region. The geofence definitions can include tolling regions, toll exclusion regions, and non-toll regions. A definition of a geofenced region is a data structure indicating geographic boundaries of the geofenced region, and can include other information such as an identification of one or more associated toll exclusion regions.

Thus, in step 2608, the mobile device determines whether the vehicle passed through the toll exclusion region 1916, and if so, then in step 2606 no toll is charged. This means that if there are location points that map into the toll exclusion geofenced region 1916, then no toll is charged. Otherwise in step 2606 a toll is charged. Accordingly, toll geofence regions, where a toll is to be charged if the vehicle passes through it, can be defined broadly, in geographic terms, so as to account for inaccuracies in location determination by various mobile device designs. Toll charges for vehicle who pass through these broadly defined toll regions can be avoided by defining toll exclusion regions on roadways near the toll regions to indicate that the vehicle was not on the toll roadway portion when its location was within a toll region. In some embodiments the method 2600 can be performed by a backend server of a toll service based on location information sent to the backend server by a mobile device. Several successive location points can be transmitted to the backend server by the mobile device upon the mobile device determining that it has passed a toll point as indicated by a geofence region definition.

Figure 20:
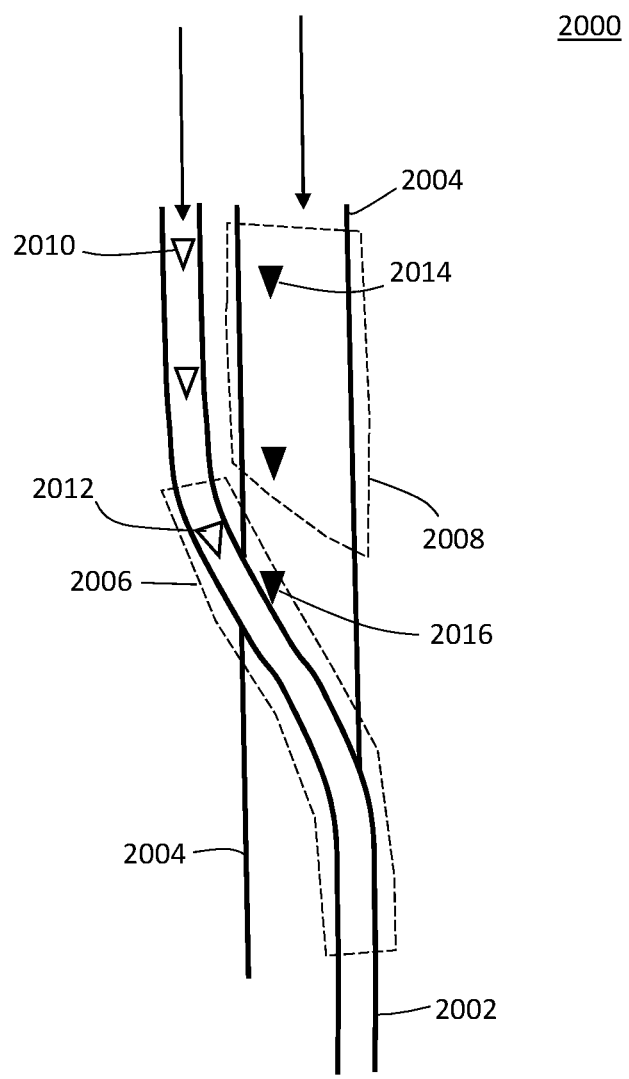
FIG. 20 is a roadway diagram showing geofenced regions indicating toll and toll-exclusion geofenced regions for determining whether to charge a toll when toll and non-toll lanes overlap, in accordance with some embodiments.

FIG. 20 is a roadway diagram 2000 showing geofenced regions indicating toll and toll-exclusion geofenced regions for determining whether to charge a toll when toll and non-toll lanes overlap, in accordance with some embodiments. In this example a toll express lane 2002 starts to the side of a non-toll section 2004 of the roadway for a given direction of traffic. The toll express lane 2002 can have an elevated portion that overlaps (e.g. passes over by a bridge) the non-toll section 2004. A toll geofence region 2006 can be defined that extends over the non-toll lane(s) 2004. Vehicles in the toll express lane 2002 will have locations on the toll express lane 2002, such as locations 2010, 2012. Location 2012 is inside the toll geofence region 2006, and will normally cause a toll to be charged upon comparing the location 2012 with the toll geofence region 2006. However, because the toll express lane 2002 overlaps the non-toll section 2004, a toll exclusion geofenced region 2008 is defined. Thus a vehicle having, for example, locations 2014, 2016 will not be charged a toll because, even though location 2016 is within the toll geofenced region 2006, location 2014 is in the toll exclusion geofenced region 2008. Vehicles on toll express lane 2002 do not pass through toll exclusion geofenced region 2008, and therefore charged a toll upon passing through toll geofenced region 2006.

Figure 21:
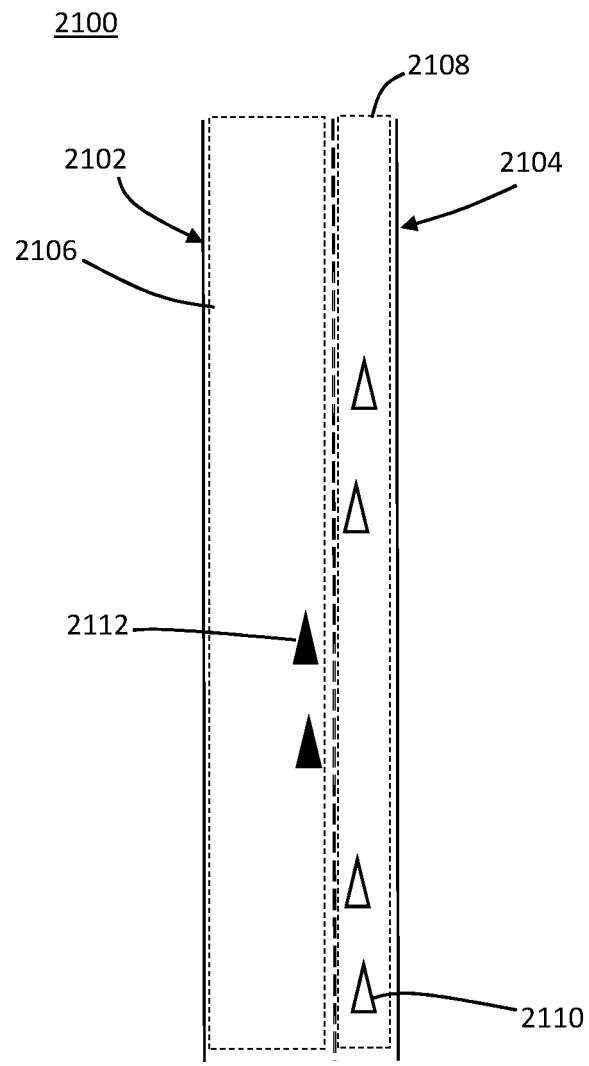
FIG. 21 is a roadway diagram showing geofenced regions indicating toll and non-toll regions where location inaccuracies can make the vehicle appear in either the toll or non-toll geofenced regions, in accordance with some embodiments.

FIG. 21 is a roadway diagram 2100 showing geofenced regions indicating toll and non-toll regions where location inaccuracies can make the vehicle appear in either the toll or non-toll geofenced regions, in accordance with some embodiments. Specifically, there is an express lane 2104 parallel and adjacent to non-toll lanes 2102. A toll geofenced region 2108 is defined over the express lane (or lanes) 2104, and a non-toll geofenced region 2106 is defined over the non-toll lanes 2102. A vehicle traveling in the express lane 2014 can have location readings indicated by the triangles, including location 2110 which is in the toll geofenced region 2108. However, due to inaccuracies in location determination, an erroneous location determination corresponding to location 2112 can occur. Overall there are shown four locations in the toll geofenced region 2108 and two locations in the non-toll geofenced region 2106. In some instances, the opposite can occur, where, due to inaccuracies, some locations are determined to be in the toll geofenced region 2108 while a majority of locations are in the non-toll geofenced region 2106. To determine whether to charge a toll or not, a majority of location positions can control the toll or no toll determination. That is, if a majority of locations are found in the toll geofenced region 2108 then a toll is charged. Likewise, if a majority of locations are in the non-toll geofenced region, then no toll is charged.

Figure 27:
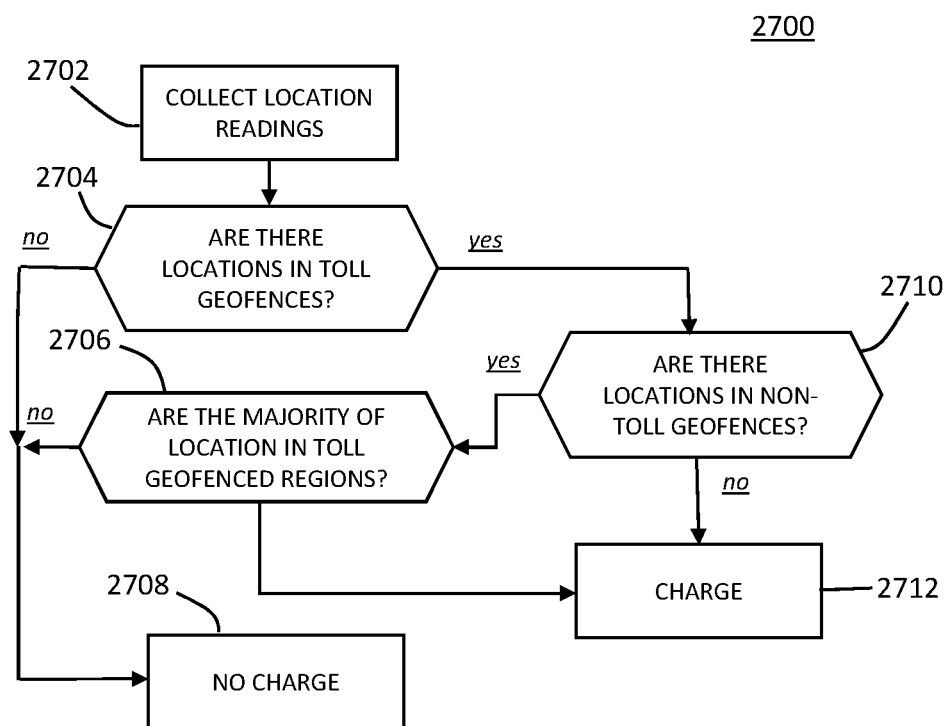
FIG. 27 is a flow chart diagram of a method for resolving whether the charge a toll when some location points of the vehicle are outside of a toll lane and some are inside the toll lane, in accordance with some embodiments.

This method is reflected in FIG. 27, which shows a flow chart diagram of a method 2700 for resolving whether the charge a toll when some location points of the vehicle are outside of a toll lane and some are inside the toll lane, in accordance with some embodiments. To be clear, the locations/location points being discussed are location coordinates determined by the mobile device, which may or may not be the actual position of the mobile device at the time the determination was made, due to errors inherent in determining location. In step 2702 location points are collected on an ongoing basis. That is, at points in time, the location of the vehicle (inferred by the location of the mobile device running the tolling application) is recorded as geolocation coordinates or an equivalent. In step 2704 a determination is made as to whether there are location points in the toll geofenced region. If yes, then in step 2710 a determination is made whether there are locations in the non-toll geofenced region. If there are no location in the non-toll geofenced region then in step 2712 a toll is charged. If in step 2710, there are locations in the non-toll geofenced region, then in step 2706 a determination is made as to whether a majority of locations along the toll geofenced region were in the toll geofenced regions. A majority of locations in the toll geofenced region results in a toll being charged, otherwise no toll is charged. The number of location points considered can depend on a variety of circumstances. In some cases all locations in geofenced regions for a given period of time can be considered. In some cases location can be determined periodically, and the most recent number (10, 20, 100, or other) location points determined can be considered.

Figure 22:
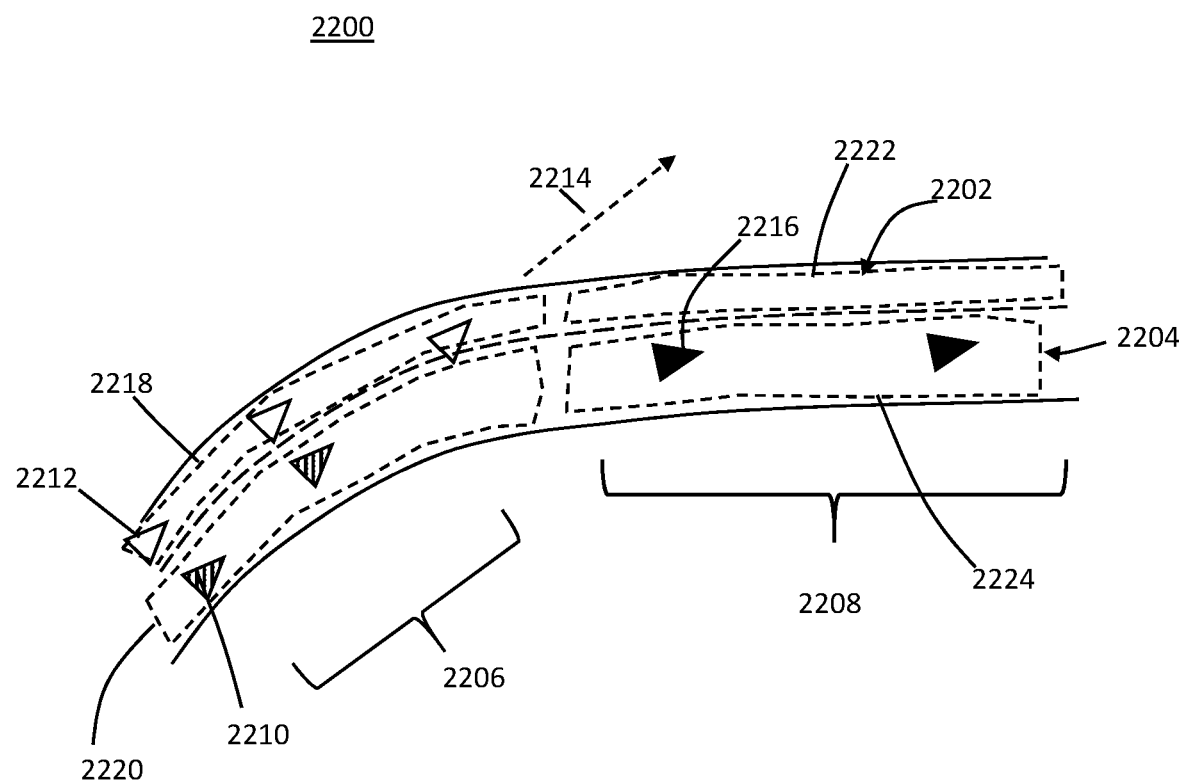
FIG. 22 is a roadway diagram of a curving roadway were inaccuracies can make the vehicle appear in either the toll or non-toll geofenced regions, in accordance with some embodiments.

FIG. 22 is a roadway diagram of a curving roadway 2200 were inaccuracies can make the vehicle appear in either the toll or non-toll geofenced regions, in accordance with some embodiments. Many location determinations are actually the result of a prediction based on a historical trajectory of the vehicle. That means the location determination subsystem doesn't always respond to location requests with actual location information, but rather with a prediction of location based on past direction and speed. As a result, for example, when a vehicle travels along a curved roadway, the location readings can be erroneous due to the prediction operation. The roadway here has an express lane 2202 which is a toll lane (or lanes) which is adjacent one or more non-toll lanes 2204. The roadway has a curved portion 2206 followed by a more straight portion 2208. In the curved portion 2206 there is toll geofenced region 2218 and non-toll geofenced region 2220. In the straight portion 2208 there is defined a toll geofenced region 2222 and a non-toll geofenced region 2224.

A vehicle traveling on the roadway is represented by the triangles. In the curved portion 2206 the vehicle is actually in location 2210, in the non-toll lane 2204, but due to prediction error using trajectory 2214, its location is given as being at location 2212, in the toll express lane 2202 (e.g. in region 2218). Subsequent to the curved portion 2206, when the vehicle is on the straight portion 2208, the vehicle's location can be accurately determined as being at location 2216 (in region 2224), for example, in the non-toll lanes 2204. As can be seen in this example, three locations erroneously fall in the toll express lane, as represented by the white triangles, while two fall in the non-toll lanes 2204, as represented by the black filled triangles. Using the majority rule of method 2700, the vehicle would be charged a toll. However, to avoid that from happening, a weighting is used where locations on the straight portion 2208 count twice as much as those found in curved portion 2206. Thus, after so weighting the locations, then it can be determined that no toll is to be charged because the two locations in region 2224 count twice that of those in region 2218, as four is greater than three.

Figure 23:
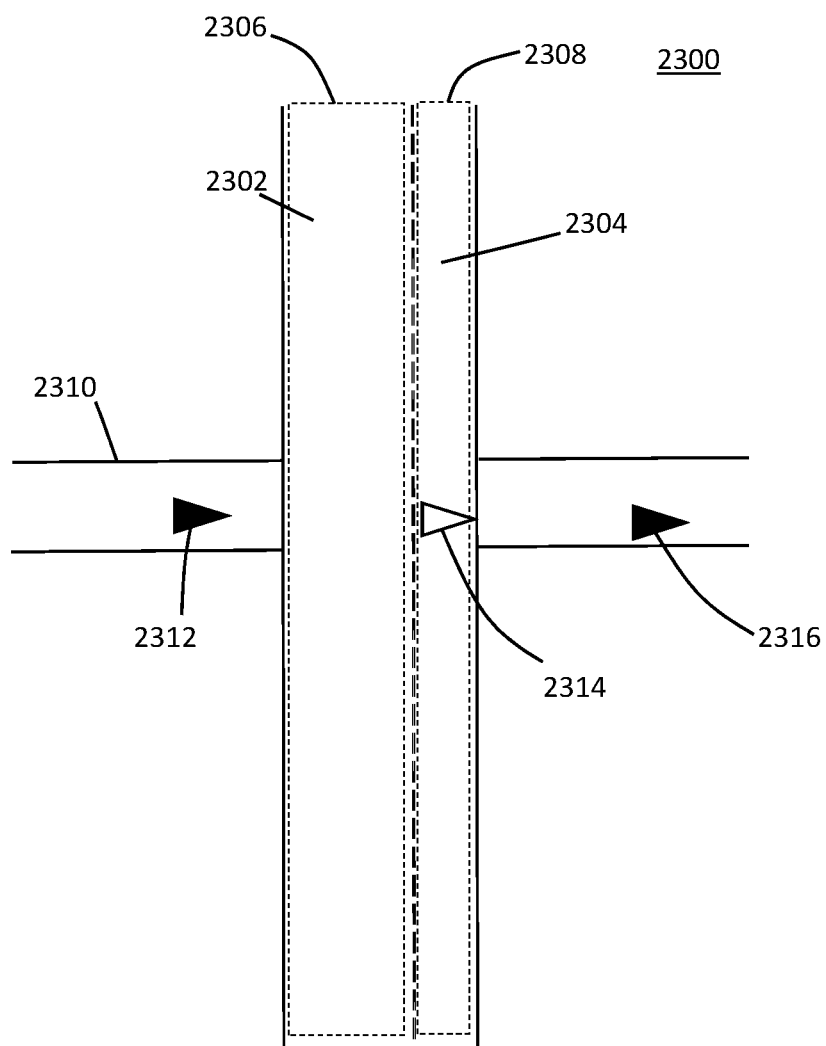
FIG. 23 is a roadway diagram showing a non-toll roadway passing under a toll roadway where the a vehicle on the non-toll roadway has a location overlapping the toll roadway, in accordance with some embodiments.

FIG. 23 is a roadway diagram 2300 showing a non-toll roadway 2310 passing under a toll roadway where the a vehicle on the non-toll roadway 2310 has a location 2314 overlapping the toll roadway, in accordance with some embodiments. The toll roadway includes a toll express lane 2304 and non-toll lanes 2302. In some embodiments the entire roadway (2302 and 2304) can be tollways, rather than having an express lane. A toll geofenced region 2308 is defined over the express lane 2304, and location determinations that fall in the toll geofenced region can result in a toll being charged. This, when a vehicle travels along the non-toll roadway 2310, having locations 2312, 2314, 2316, it can be seen that one of those locations falls in toll geofenced region 2308. To prevent a toll being charged, then, a rule is used where there must be at least two locations in a toll geofenced region, and the two locations must have a minimum separation distance in order to prevent the situation where the vehicle stops under the express lane for an extended period of time as being counted as multiple locations in a toll geofenced region.

Figure 24:
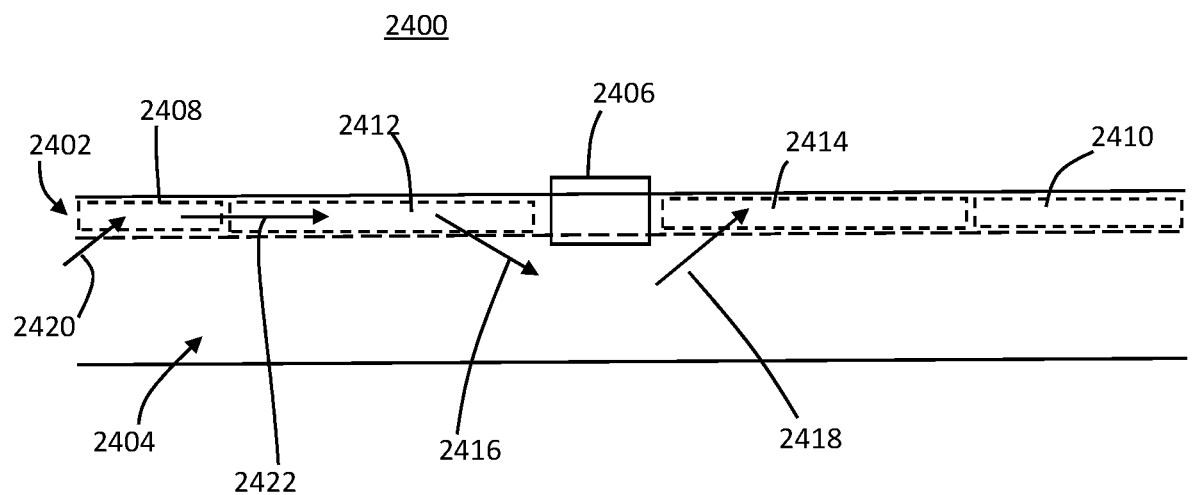
FIG. 24 is a roadway diagram of a roadway having a toll express lane with geofenced regions defined to determine whether a vehicle has committed a violation of leaving a toll lane early or entering a toll lane improperly, in accordance with some embodiments.

FIG. 24 is a roadway diagram of a roadway 2400 having a toll express lane 2402 with geofenced regions defined to determine whether a vehicle has committed a violation of leaving a toll lane early or entering a toll lane improperly, in accordance with some embodiments. The toll express lane 2402 can be the entire roadway, or it can be adjacent to one or more non-toll lanes 2404. Along the toll express lane (or lanes) 2402 is a toll point 2406. The toll point 2406 can be a virtually defined region, such that when a vehicle passes the physical location corresponding to the virtual toll point, the tolling application program determines that the toll point 2406 has been entered and passed, and a toll is then charged. There can be a buffer zone around the toll point 2406 to help ensure that location determination will occur inside the region defining the toll point 2406 (i.e. due to speed of vehicles and latency in location determination).

People using the toll express lane 2402 may realize the location of the toll point 2406 and attempt to drive around it to avoid being charged a toll. Several different geofenced regions can be defined along the express lane 2402. For example, entry and exit zones 2408, 2410 can be defined. As their names imply, vehicles are allowed to enter and exit the toll express lane 2402 in these zones 2408, 2410, and they may be indicated my markings on the roadway as well as on a navigation display of the tolling application or other navigation application program on the mobile device. There can further be a pre-tolling point geofenced region 2412 before the tolling point 2406, and a post tolling point geofenced region 2414 after the tolling point 2406. Location in these regions 2408, 2412, 1214, 2410 can be determined and recorded. Thus, a vehicle entering an entry zone 2408, as indicated by arrow 2420, can travel along the tolling lane 2402 as further indicated by arrow 2422, in pre-tolling point geofenced region 2412. If the vehicle attempts to evade tolling point 2406 by exiting the pre-tolling point geofenced region 2412 as indicated by arrow 2416, and/or enter/re-enter the express lane 2402 in post tolling point geofenced region 2414, as indicated by arrow 2418, a toll will still be charged, and a fine may be charged as well.

Figure 28:
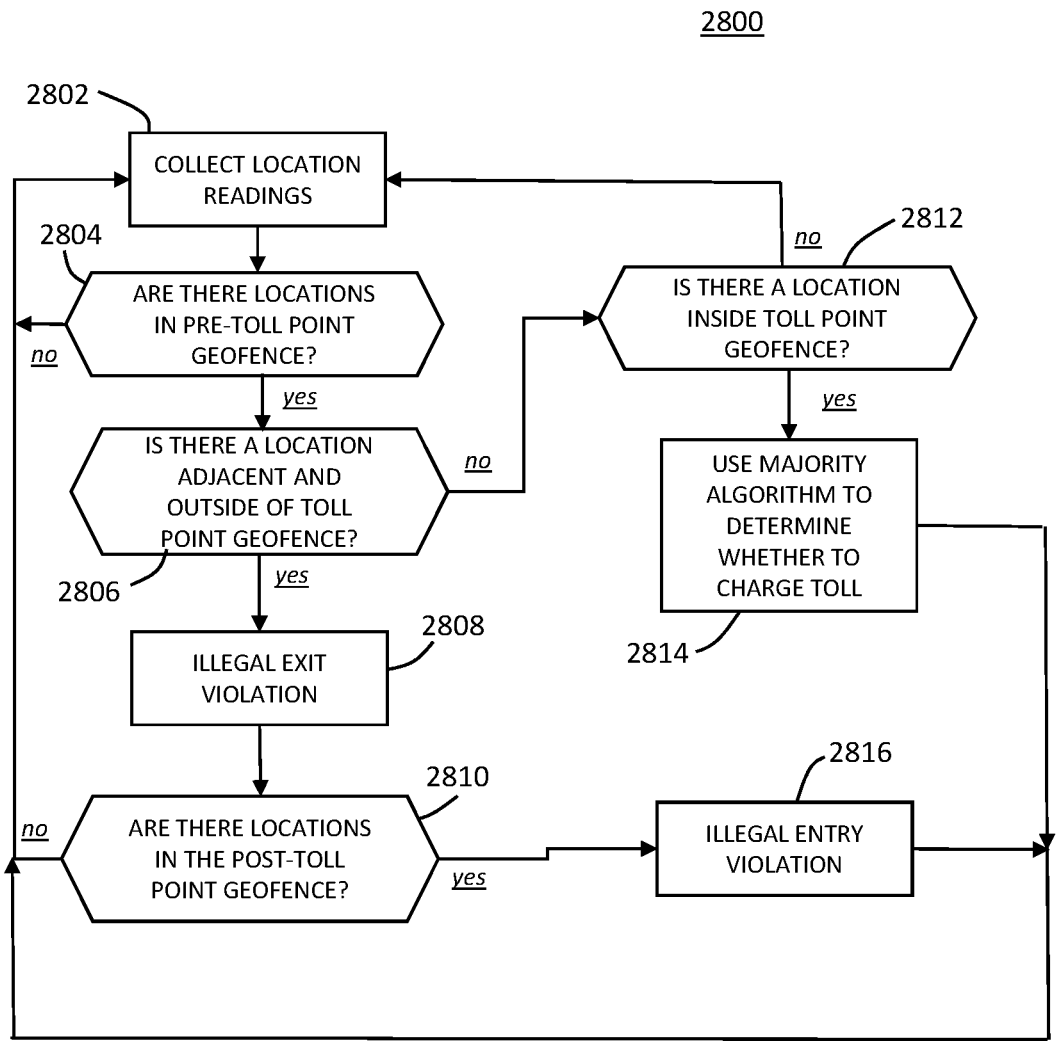
FIG. 28 is a flow chart diagram of a method for determining improper toll lane departures and entries, in accordance with some embodiments.

An example of a method for charging a toll and/or violation fines is shown in FIG. 28. FIG. 28 shows a flow chart diagram of a method 2800 for determining improper toll lane departures and entries, in accordance with some embodiments. At step 2802 the application program is running on the mobile device and is collecting location data. In step 2804 the application program determines whether there are locations in the pre-tolling point geofenced region. If not, the method simply returns to collecting location information. If there are location readings in the pre-tolling point geofenced region, then in step 2806 the method can determine if there are any location points in the non-tolling lanes adjacent to the tolling point. If no, then the method proceeds to step 2812 where the method can determine if there are any location points in the tolling point geofenced region, and if so, then in step 2814 the majority rule can be applied (e.g. method 2700) to determine whether to charge a toll or not. In step 2806, if there are location points outside of the tolling point and adjacent the tolling point, then it can be determined that an exit violation has occurred. If, in step 2810 there are also location points in the post-tolling point geofenced region, there can also be entry violation determined. In either case, a fine can be charged to the user's account, as well as the toll charge. It is also contemplated a similar method can occur by going from step 2804 to step 2810 when there are not location in the pre-toll point geofence, rather than returning to step 2802.

Figure 25:
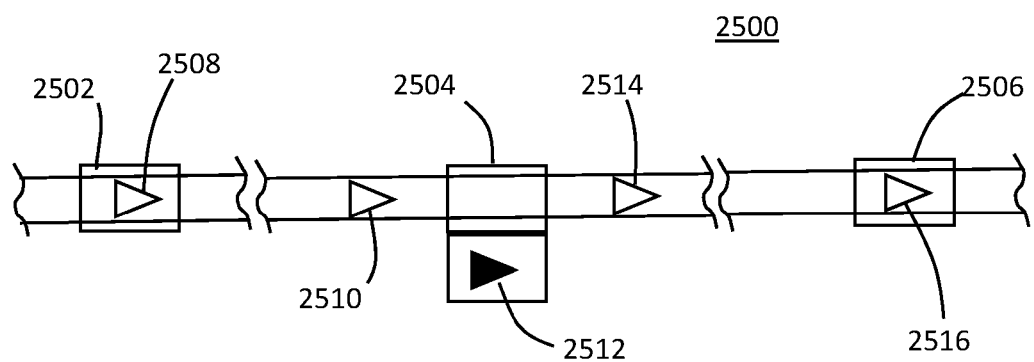
FIG. 25 is a roadway diagram of a roadway having a toll express lane and multiple toll points along the toll express lane for indicating how a toll charge is determined when a vehicle appears to be out of the toll express lane for one or more toll points, in accordance with some embodiments.
Figure 29:
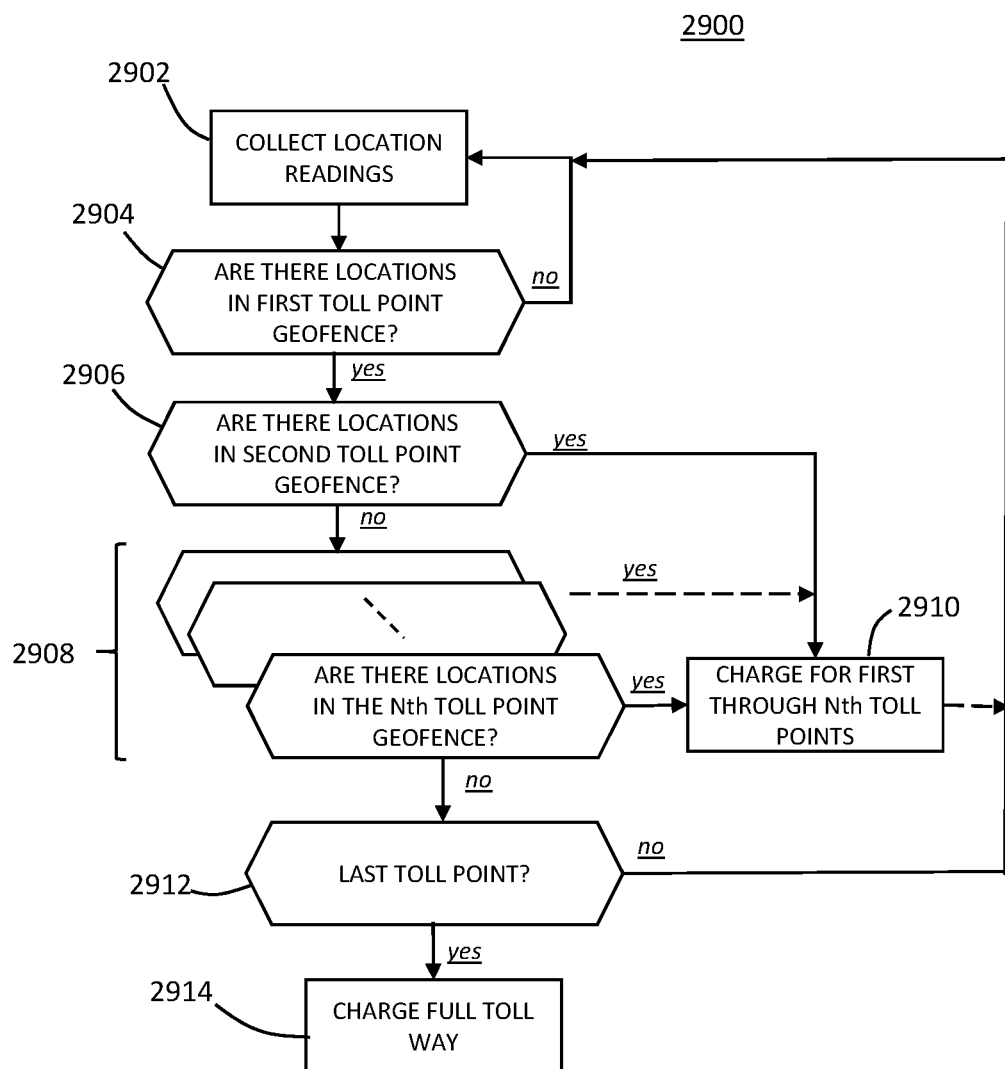
FIG. 29 is a flow chart diagram of a method for determining a toll charge for a multi-toll point roadway when it appears the vehicle did not pass through one or more toll points, in accordance with some embodiments.

FIG. 25 is a roadway diagram of a roadway 2500 having a toll express lane and multiple toll points along the toll express lane for indicating how a toll charge is determined when a vehicle appears to be out of the toll express lane for one or more toll points, in accordance with some embodiments. The toll lane, for example, can have toll points 2502, 2504, 2506, and more. A toll is charged as a vehicle passes each toll point, and entry/exit of the toll lane can be controlled using the scheme of FIG. 24, where entry and exit locations are defined, and determined and set by a traffic authority. In some cases, a toll point may be missed by mere chance, or due to inaccuracy, construction, or other reasons. For example, locations can be recorded at points 2508, 2510, 2512, 2514, and 2516. Location 2512 is outside of the tolling point 2504, but because the vehicle appears to have travelled entirely in the toll express lane, toll for tolling point 2504 is still charged. FIG. 29 shows an example of a method for ensuring the full toll is charged for trips across multiple toll points.

FIG. 29 is a flow chart diagram of a method 2900 for determining a toll charge for a multi-toll point roadway when it appears the vehicle did not pass through one or more toll points, in accordance with some embodiments. In step 2902 the tolling application program commences collecting location information, which includes location points as determined by the mobile device on which the tolling application program. In step 2904 the method determines whether the vehicle was located in a first tolling point. That is, a location with the region corresponding to a geofence definition of a tolling point. The determination can be a direct location actually in the tolling point geofenced region, and an inference drawn based on a majority rule of several location points around the tolling point. Then in step 2906 the method determines whether the vehicle was in the next tolling point along the tollway. If not then the method continues for each tolling point until either a location is found in one of the tolling points, in which case the method proceeds to step 2910 and toll is also charged for all of the interim tolling points, or, in step 2912, if the last tolling point for the roadway is reached, the full toll for the entire roadway can be charged. Otherwise the method simply returns to collecting location information in step 2902.

Figure 30:
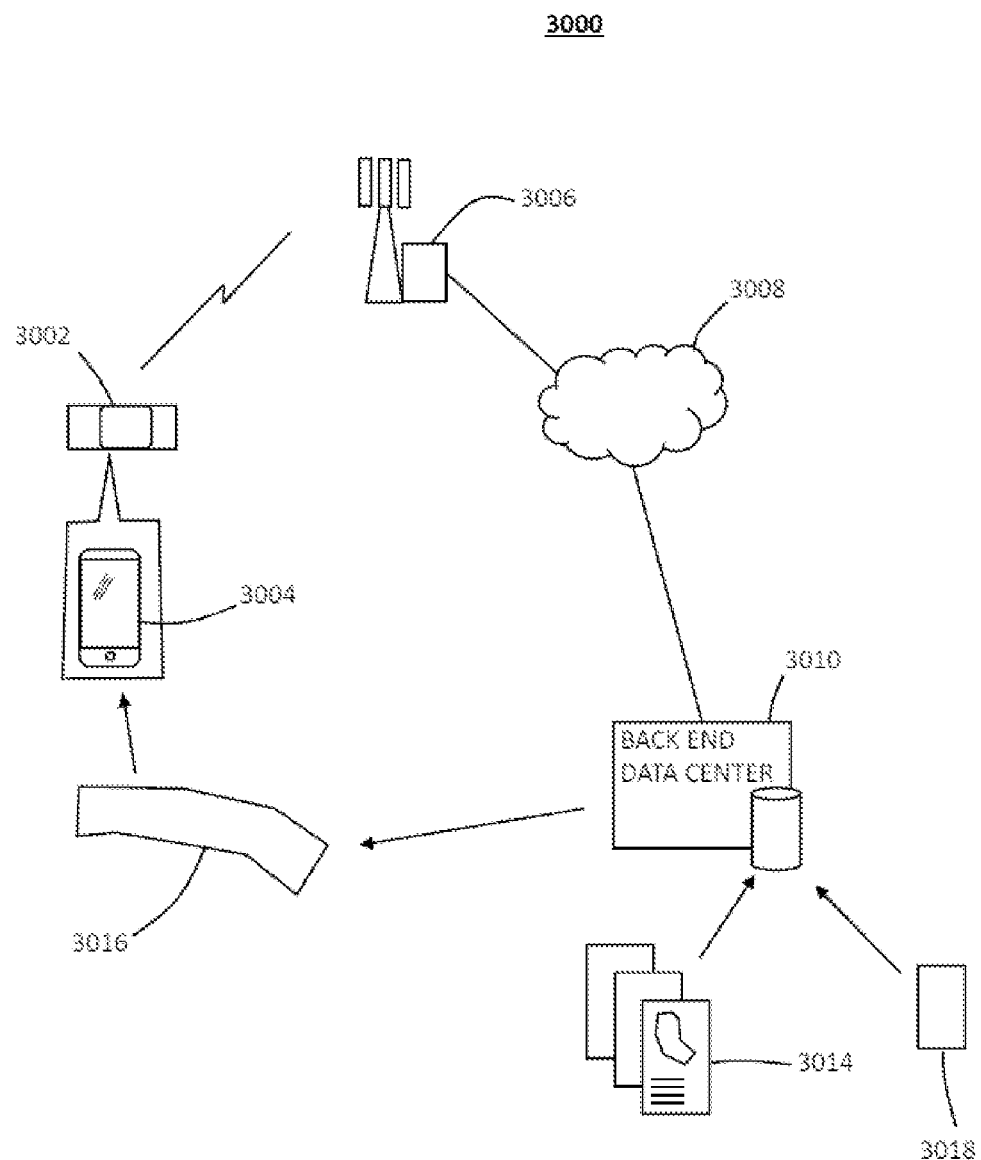
FIG. 30 is a system diagram of a tolling system, in accordance with some embodiments.

FIG. 30 is a system diagram of a tolling system 3000, in accordance with some embodiments. A vehicle 3002 can travel on roadways, including both toll and non-toll roadways. The vehicle 3002 includes a mobile device 3004 which can be a cellular phone device, capable of communicating with a cellular communications network 3006. The cellular communications network 3006 is in turn connected to various communications networks such as the Public Switched Telephone Network (PT SN) and the internet 3008. A tolling service back end data center 3010 is also connected to the internet 3008. Thus, mobile device 3004 is capable of communicating with the tolling service back end data center 3010 through the cellular communications network and the internet. Specifically, a tolling application program on the mobile device 3004 communicates with the tolling service back end data center 3010. In general, the mobile device only sends location information to the tolling service back end data center when the mobile device is within a geofenced region associated with a toll road, or other geographically defined region for which the backend data center performs a service. For example, the back end data center 3010 can define general geofenced regions to activate the service; if the mobile device is outside of those regions, it does not need to interact with, or report its location to the back end data center. This respects the privacy of the user.

The mobile device 3004 can retrieve general geofence definitions from the back end data center 3010, such as geofence definition 3016. When the mobile device is outside of the region corresponding to geofence definition 3016, the mobile device does not report its location to the back end data center 3010. When the mobile device determines that it is within the region corresponding to the geofence definition 3016 it begins reporting its location periodically to the back end data center.

The back end data center 3010, in addition to general geofence definitions such as geofence definition 3016, includes sets of refined geofence definitions 3014. These geofence definitions 3014 each define smaller regions inside of the larger, general geofenced definitions such as geofence definition 3016. For example, geofence definition 3016 can correspond to a region that is mile, tens of miles, or even hundreds of miles long along a toll road. The refined geofence definitions 3014 can define geographic regions such as those shown in FIGS. 19-29. Further, each refined definition 3014 can include a set of rules for processing location information that falls within those refined definitions. For example, in FIG. 19, the geofence definition for geofence region 1914 can include a rule that dictates that when a location falls in region 1914, which would ordinarily result in a toll being charged, a prior location in geofence region 1916 means no toll is charged. Likewise, in FIG. 20, when a location falls in region 2006, a prior location in region 2008 means no toll is charged. Thus, rules can be defined that determine how location information is processed, and what action, if any to take (e.g. charge a toll, issue a violation warning, etc.) Rules can be defined to implement the "majority rules" process as exemplified in FIG. 21, as well as a weighting approach as exemplified by FIG. 22, a "two or more locations" being required rule as exemplified by FIG. 23, and so on. The rules define mathematical or logical operations that can be applied in evaluating the location information received from each user.

Location information is received and tracked in a record 3018. A separate location record is created for each user, and can have a maximum duration, meaning older location information is not kept. In some embodiments, for example, and location information older than 30 minutes can be deleted from the record. This ensures that location information is not kept, and frees up resources for other tasks. The record 3018 is used to process the rules of the various geofence definitions 3014. The system can be used for other applications beyond toll payment, as well.

When location is reported, the relative location accuracy of the particular mobile device (e.g. 3004) can be taken into account. That is various mobile devices have varying levels of location accuracy. The location determination accuracy of a given mobile device can be taken into account when processing rules for a given geofence definition. For example, if the accuracy is particularly poor, then a "majority rules" rule may have to be applied. Thus, rules can be conditional on the location determination accuracy of a given mobile device.

Figure 31:
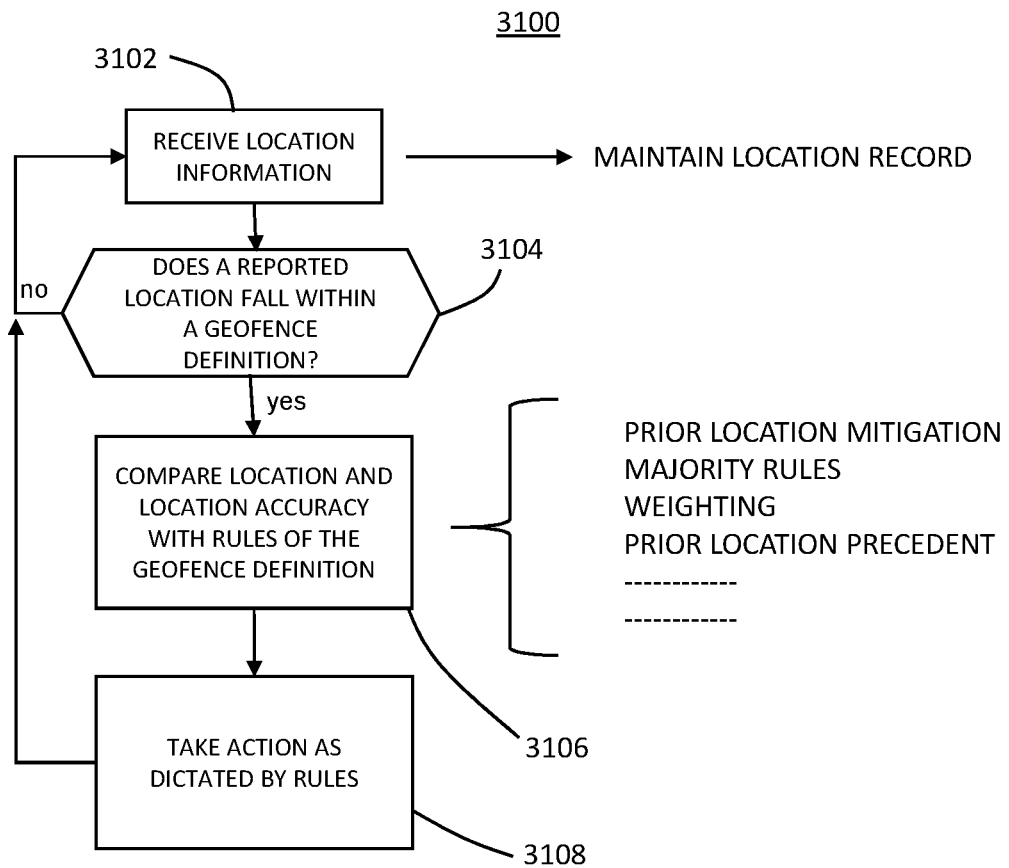
FIG. 31 is a flow chart diagram of a method for processing user location data using geofence definitions, in accordance with some embodiments.

FIG. 31 is a flow chart diagram of a method 3100 for processing user location data using geofence definitions, in accordance with some embodiments. In step 3102 the back end data center receives location reports from a given mobile device running the application program. The application program can be a tolling application program. As location information is received, a location record is maintained for the user account associated with the mobile device. As mentioned, the mobile device only sends location information when it is within a generally defined geofence region in which the service is operational. For regions outside of where the service is operations, the mobile device does not need to report its location.

In step 3014, as each new location is reported, it is compared with defined geofence regions (which can be indexed by coordinates). If the location does not fall within a geofenced region, then no action is needed. If the location does fall within a geofenced region, when in step 3016 the data center can apply rules associated with that geofenced region. The operator of the service can define any rules to be applied, but for a tolling service as described, rules such as those exemplified in FIGS. 19-29, and others, can be defined for various geofence definitions. An evaluation of the rules can dictate an action to take, or not to take as the case may be, in step 3108.

Accordingly, the inventive disclosure provides a method for defining and applying toll exclusion zones to avoid inadvertent toll charges based on location. The method can include receiving, at a backend server from a mobile device, a plurality of locations of the mobile device, wherein the plurality of locations are each determined in succession by the mobile device. The method can further include the backend server comparing each of the plurality of locations to at least one of a plurality of definitions of geofenced toll regions which corresponds to a toll roadway. The method can further include the backend server determining that at least one of the plurality of locations of the mobile device fall within the one of the plurality of geofenced toll regions, wherein when a location of the mobile device is within any of the plurality of geofenced toll regions a toll is normally charged by the backend server to a toll account associate with the mobile device. The method can further include, when one of the plurality of locations are within the one of the plurality of geofenced toll regions, comparing the plurality of locations with a geofence region associated with the one of the plurality of geofenced toll regions. The method can further include determining that at least one of the plurality of locations indicates that the mobile device was in the geofence region associated with the one of the plurality of geofenced toll regions. The method can further include, responsive to determining that at least one of the plurality of locations indicates that the mobile device was in the geofence region associated with the one of the plurality of geofenced toll regions, inhibiting the toll being charged to the toll account.

In some embodiments determining that at least one of the plurality of locations indicates that the mobile device was in the geofence region associated with the one of the plurality of geofenced toll regions comprises determining that the geofence region associated with the one of the plurality of geofenced region is a toll exclusion geofence region.

In some embodiments determining that at least one of the plurality of locations of the mobile device fall within the one of the plurality of geofenced toll regions, and determining that at least one of the plurality of locations indicates that the mobile device was in the geofence region associated with the one of the plurality of geofenced regions, comprises determining that the plurality of locations indicate that the mobile device was in the geofence region associated with the one of the plurality of geofenced toll regions more than it was in the one of the plurality of geofenced toll regions.

In some embodiments the method can further include applying a weighting to locations of the mobile device determined to be in the geofence region associated with the one of the plurality of geofenced toll regions count more than locations of the mobile device in the one of the plurality of geofenced toll regions.

In some embodiments the geofence region associated with the one of the plurality of geofenced toll regions is defined over a curved section of roadway, and the one of the plurality of geofenced toll regions is a straight section of roadway.

In some embodiments of the inventive disclosure there is provided a method for improving tolling accuracy in an automated location-based tolling system that includes defining at least one geofenced toll region corresponding to a toll portion of a roadway for which a toll is charged, and defining an associated geofence region corresponding to a non-toll portion of a roadway, wherein the toll roadway and non-toll roadway are geographically proximate to each other. The method further includes a mobile device determining its location periodically to produce a plurality of locations, and comparing the plurality of locations with the at least one geofenced toll region and the associated geofence region. The method can further include determining that the plurality of locations include at least one location in the at least one geofenced toll region and at least on location in the associated geofenced region. The method can further include inhibiting a toll transaction from occurring, for a toll account associated with the mobile device, responsive to determining that the plurality of locations include at least one location in the at least one geofenced toll region and at least on location in the associated geofenced region.

In some embodiment of the inventive disclosure, there is provided a method for identifying an attempt to avoid a toll charge that include defining a plurality of geofence regions over a portion of a roadway having a toll lane and a non-toll lane adjacent the toll lane and a direction of traffic. The plurality of geofence regions including a toll point region corresponding to a location of a toll point in the toll lane, a pre-toll point region corresponding to a portion of the toll lane before the toll point in the direction of traffic, and a post toll point region corresponding to the portion of the toll lane past the toll point in the direction of traffic. The method can further include determining, by a mobile device, a plurality of locations of the mobile device along the roadway, determining that at least one of the plurality of location is in the non-toll lane at a point in the non-toll lane adjacent the toll point region in the toll lane, and determining that at least one of the plurality of locations is in either the a pre-toll point region or the post toll point region. Responsive to determining that at least one of the plurality of locations is in either the a pre-toll point region or the post toll point region, the method can further include charging toll to a toll account associated with the mobile device.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this and the related documents field herewith, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The following claims are hereby incorporated into the description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method for defining and applying toll exclusion zones to avoid inadvertent toll charges based on location, comprising:
    defining, by a backend server of a tolling service, a first plurality of location polygons, each one of the first plurality of location polygons corresponding to a respective one of a plurality of geofenced toll regions;
    defining, by the backend server a plurality of geofenced non-toll regions, wherein each one of the plurality of geofenced non-toll regions corresponds to a non-toll roadway portion that is geographically proximate to one of the plurality of geofenced toll regions;
    transmitting, by the backend server to a mobile device that is present in a vehicle, the first plurality of location polygons, wherein the mobile device monitors its location relative to the first plurality of location polygons and transmits its location to the backend server only when the vehicle is within one of the first plurality of location polygons;
    receiving, at the backend server from the mobile device, a plurality of locations of the mobile device, wherein the plurality of locations are location points represented in geolocation coordinates that are each determined in succession by the mobile device, and which are determined by a satellite location receiver of the mobile device which includes an inherent location inaccuracy;
    the backend server comparing each of the plurality of locations to at least one of a plurality of geofenced toll regions which corresponds to a toll roadway;
    the backend server determining that at least one of the plurality of locations of the mobile device falls within the one of the plurality of geofenced toll regions, wherein when a location of the mobile device is within any of the plurality of geofenced toll regions a toll is normally charged by the backend server to a toll account associated with the mobile device;
    the backend server further determining that there is at least one geofenced non-toll region associated with the one of the geofenced toll regions in which the one of the plurality of locations falls, wherein the association of the at least one geofenced non-toll region with the one geofenced toll region is based on a geographic proximity of the at least one geofenced non-toll region with the one geofenced toll region;
    the backend server further determining that at least one of the plurality of locations is within at least one geofenced non-toll region associated with the one of the geofenced toll regions;
    responsive to the backend server determining that at least one of the plurality of locations is within at least one geofenced non-toll region associated with the one of the geofenced toll regions, the backend server inhibiting a toll being charged to the toll account that would otherwise be charged for one of the plurality of locations being in the one of the plurality of geofenced toll regions.

2. The method of claim 1, wherein determining that at least one of the plurality of locations is within at least one geofenced non-toll region associated with the one of the geofenced toll regions further comprises determining that the at least one geofenced non-toll region is a toll exclusion region.

3. The method of claim 1, wherein in response to the backend server further determining that at least one of the plurality of locations is within at least one geofenced non-toll region associated with the one of the geofenced toll regions, the backend server further determining that there are more of the plurality of locations in the at least one geofenced non-toll region than in the one of the geofenced toll regions.

4. The method of claim 3, further comprising the backend server applying a weighting to locations of the mobile device determined to be in the at least one geofenced non-toll region to count more than locations of the mobile device in the one of the plurality of geofenced toll regions.

5. The method of claim 4, wherein the ate last one geofence non-toll region associated with the one of the plurality of geofenced toll regions is defined over a curved section of roadway, and the one of the plurality of geofenced toll regions is defined over a straight section of roadway.

* * * * *